(12) United States Patent
Pan

(10) Patent No.: US 8,743,184 B2
(45) Date of Patent: Jun. 3, 2014

(54) PHOTOGRAPHING APPARATUS AND FOCUS POSITION DETERMINING METHOD

(75) Inventor: Yi Pan, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 254 days.

(21) Appl. No.: 13/132,807

(22) PCT Filed: Dec. 17, 2009

(86) PCT No.: PCT/JP2009/071040
§ 371 (c)(1),
(2), (4) Date: Jun. 3, 2011

(87) PCT Pub. No.: WO2010/071173
PCT Pub. Date: Jun. 24, 2010

(65) Prior Publication Data
US 2011/0234768 A1    Sep. 29, 2011

(30) Foreign Application Priority Data

Dec. 19, 2008  (JP) ................................. 2008-323339

(51) Int. Cl.

| | | |
|---|---|---|
| H04N 13/00 | (2006.01) | |
| H04N 13/02 | (2006.01) | |
| G02B 7/28 | (2006.01) | |
| G02B 7/38 | (2006.01) | |
| G03B 19/07 | (2006.01) | |
| G03B 13/18 | (2006.01) | |
| G03B 13/20 | (2006.01) | |
| G03B 13/22 | (2006.01) | |
| G03B 13/24 | (2006.01) | |
| G03B 13/32 | (2006.01) | |
| G03B 13/34 | (2006.01) | |
| G03B 13/36 | (2006.01) | |
| H04N 21/218 | (2011.01) | |

(52) U.S. Cl.
CPC ....... *H04N 13/0239* (2013.01); *H04N 13/0296* (2013.01); *H04N 13/0055* (2013.01); *H04N 2013/0081* (2013.01); *G02B 7/28* (2013.01); *G02B 7/38* (2013.01); *G03B 19/07* (2013.01); *G03B 13/18* (2013.01); *G03B 13/20* (2013.01); *G03B 13/22* (2013.01); *G03B 13/24* (2013.01); *G03B 13/32* (2013.01); *G03B 13/34* (2013.01); *G03B 13/36* (2013.01); *H04N 21/21805* (2013.01)
USPC .................. 348/47; 348/42; 348/43; 348/44; 348/45; 348/46

(58) Field of Classification Search
CPC ........ G03B 13/18; G03B 13/20; G03B 13/22; G03B 13/24; G03B 13/32; G03B 13/34; G03B 13/36; G03B 3/10; G03B 19/07; G03B 35/08; H04N 13/0239; H04N 13/0296; H04N 13/0055; H04N 2013/0081; H04N 5/23212; G06T 7/0022; G02B 7/28; G02B 7/38
USPC .......................................................... 348/47
See application file for complete search history.

(56) References Cited

U.S. PATENT DOCUMENTS

| | | | | |
|---|---|---|---|---|
| 4,123,152 | A * | 10/1978 | Farnum ........................... | 352/69 |
| 5,430,474 | A * | 7/1995 | Hines .............................. | 348/42 |
| 5,668,595 | A * | 9/1997 | Katayama et al. .......... | 348/218.1 |
| 5,678,088 | A * | 10/1997 | Fuss ................................ | 396/323 |
| 5,687,412 | A * | 11/1997 | McIntyre ........................ | 396/319 |
| 5,749,006 | A * | 5/1998 | McIntyre et al. .............. | 396/310 |
| 5,852,753 | A * | 12/1998 | Lo et al. ......................... | 396/323 |
| 5,864,360 | A * | 1/1999 | Okauchi et al. ................. | 348/47 |
| 6,014,165 | A * | 1/2000 | McIntyre et al. ............... | 348/64 |
| 6,112,033 | A * | 8/2000 | Yano et al. ...................... | 396/323 |
| 6,157,337 | A * | 12/2000 | Sato ................................ | 341/155 |
| 6,271,876 | B1 * | 8/2001 | McIntyre et al. ............... | 348/46 |
| 7,509,041 | B2 * | 3/2009 | Hosono .......................... | 396/60 |
| 2002/0009299 | A1 * | 1/2002 | Lipton ........................... | 396/324 |
| 2002/0047835 | A1 * | 4/2002 | Kawai et al. ................... | 345/204 |
| 2003/0020814 | A1 * | 1/2003 | Ono ................................ | 348/220.1 |
| 2003/0150973 | A1 | 8/2003 | Misawa | |
| 2003/0160886 | A1 | 8/2003 | Misawa et al. | |
| 2008/0211941 | A1 * | 9/2008 | Deever et al. .................. | 348/262 |
| 2008/0218612 | A1 | 9/2008 | Border et al. | |
| 2008/0239064 | A1 * | 10/2008 | Iwasaki ........................... | 348/47 |

FOREIGN PATENT DOCUMENTS

| JP | 8-223607 | A |   | 8/1996  |           |
|----|----------|---|---|---------|-----------|
| JP | 8-242468 | A |   | 9/1996  |           |
| JP | 9-187039 | A |   | 7/1997  |           |
| JP | 09187039 | A | * | 7/1997  | H04N 13/02 |
| JP | 10-142478 | A |  | 5/1998  |           |
| JP | 10142478 | A | * | 5/1998  | G02B 7/06 |
| JP | 2005-45511 | A |  | 2/2005  |           |
| JP | 2006-162990 | A |  | 6/2006  |           |
| JP | 2007-288799 | A |  | 11/2007 |           |
| JP | 2007288799 | A | * | 11/2007 | H04N 5/26 |
| JP | 2008-197676 | A |  | 8/2008  |           |
| JP | 2008197676 | A | * | 8/2008  | G02B 7/26 |

OTHER PUBLICATIONS

Yuuki, ""2.2" QVGA Scan-Backlight Three-Dimensional LCD", (http://www.3dc.gr.jp/t_est_bench/jp/act_rep/050902/Yuuki.pdf), May 2005.

European Search Report dated Sep. 17, 2013 issued in corresponding European Patent Application 09833476.6.

Notification of Reasons for Refusal dated Jan. 28, 2014 issued by the JPO in corresponding Japanese Patent Application No. 2013-005888 with an English translation.

\* cited by examiner

*Primary Examiner* — Andy Rao
*Assistant Examiner* — Shan Elahi
(74) *Attorney, Agent, or Firm* — Birch, Stewart, Kolasch & Birch, LLP

(57) ABSTRACT

A photographing apparatus is provided that accurately determines focus positions of two photographing sections in the same degree of time as in the past and a focus position determining method. A search range setting section 121 calculates one boundary value Pn' of a second search area and calculates the other boundary value Pf' of the second search area on the basis of a focus position P1 of a first focus lens FLA detected by an AF detecting section 120 and a boundary value N of a search area on a near side and a boundary value F of a search area on a far side. The AF detecting section 120 searches for a focus position P2 while instructing a second F lens driving section 104B to move a second focus lens FLB in a second search area (Pn' to Pf') narrower than a first search area.

5 Claims, 18 Drawing Sheets

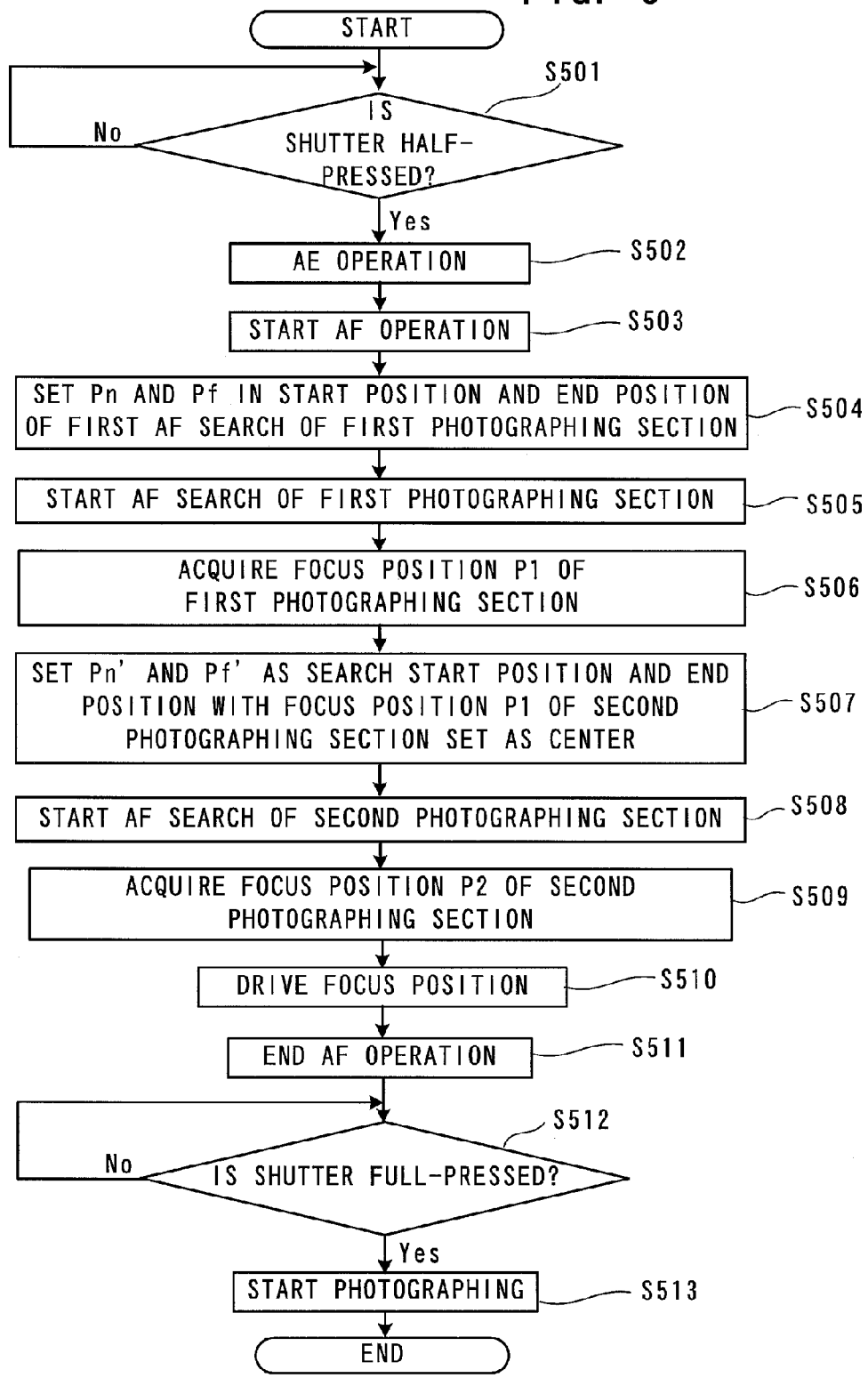

A. INITIAL AF OPERATION

B. AF OPERATION AFTER INITIAL AF OPERATION

PHOTOGRAPHING APPARATUS AND FOCUS POSITION DETERMINING METHOD

TECHNICAL FIELD

The present invention relates to a photographing apparatus that includes a first photographing section and a second photographing section and performs photographing using these two photographing sections and a focus position determining method in the photographing apparatus.

BACKGROUND ART

In the past, a large number of photographing apparatuses including two photographing sections have been proposed (see Patent Literatures 1 and 2). When the two photographing sections are provided in this way, it is possible to perform, using the two photographing sections, for example, panoramic photographing at an ultra-wide angle and photographing at different sensitivities in the respective two photographing sections. Among the photographing apparatuses disclosed in Patent Literatures 1 and 2 and the like, there are photographing apparatuses that may perform stereoscopic photographing.

In the photographing apparatus that performs the stereoscopic photographing using the two photographing sections, the two photographing sections are provided side by side in positions corresponding to the right eye and the left eye with a parallax imparted to the photographing sections. An image signal for right eye and an image signal for left eye are respectively generated in a signal processing section at a post stage on the basis of image signals output from both the photographing sections. When the image signal for right eye and the image signal for left eye generated by the signal processing section of the photographing apparatus in this way are input to a display apparatus having a display screen capable of performing three-dimensional display described in Non Patent Literature 1, a stereoscopic image is displayed on the display screen.

Incidentally, in most digital cameras, when focus adjustment, i.e., adjustment of a focus position is performed, focus position determining section disposed on the inside performs so-called AF (Auto Focus) search for moving a focus lens in a photographing optical system within a predetermined search area, detecting contrast while moving the focus lens, and setting a position where the contrast is the maximum as a focus position of the focus lens.

In the photographing apparatus of Patent Literature 1, because the two photographing sections capture the same subject, the AF search is carried out only in one photographing section and a result of the AF search is reflected on the other photographing section to obtain a reduction in time required for the AF search of the photographing apparatus having the two photographing sections. In the photographing apparatus of Patent Literature 2, there is proposed a technique for causing the focus position determining section on the inside to perform the AF search for respectively moving focus lenses included in both the photographing sections in opposite directions and determining focus positions of both the photographing sections using an AF search result of the photographing section that detects a focus position earlier of both the photographing sections.

However, in the two photographing sections, fluctuation and the like of lens diameters of the focus lenses, diameters of lens barrels, and light reception sensitivities of imaging elements are inevitably present (in the following description, these are collectively referred to as individual difference). Therefore, as in Patent Literatures 1 and 2, if the focus position of one photographing section is reflected on the other photographing section, the focus position of the other photographing section shifts because of the individual difference.

CITATION LIST

Patent Literature

Patent Literature 1: Japanese Laid-open Patent Publication No. 2005-45511
Patent Literature 2: Japanese Laid-open Patent Publication No. 2006-162990

Non Patent Literature

Non-Patent Literature 1: Internet<URL: http://www.3dc.grjp/jp/act_rep/050902/Yuuki.pdf>

DISCLOSURE OF INVENTION

Technical Problem

In view of the circumstances, it is an object of the present invention to provide a photographing apparatus that may accurately determine focus positions of two photographing sections in the same degree of time as in the past and a focus position determining method in the photographing apparatus.

Technical Solution

A first photographing apparatus to obtain the object includes:

a first photographing section that includes a first photographing optical system which includes a first focus lens, a first focus lens driving section which moves the first focus lens in an optical axis direction, and a first imaging element which receives subject light obtained by focusing a subject with the first photographing optical system and generates an image signal representing the subject;

a second photographing section that includes a second photographing optical system which includes a second focus lens, a second focus lens driving section which moves the second focus lens in an optical axis direction, and a second imaging element which receives subject light obtained by focusing the subject with the second photographing optical system and generates an image signal representing the subject; and a focus position determining section that searches for a focus position while moving the first focus lens in a predetermined first search area and stops the first focus lens at the focus position and, for the second photographing optical system, searches for a focus position while moving the second focus lens in a second search area narrower than the first search area including a focus expected position of the second focus lens corresponding to the focus position of the first focus lens and stops the second focus lens at the focus position.

With the first photographing apparatus of the present invention, for the first photographing optical system, the focus position determining section executes AF search in the first search area, and, for the second photographing optical system, executes the AF search in a second search area narrower than the first search area including the focus expected position corresponding to the focus position of the first focus lens. Specifically, the focus position determining section searches for, without directly positioning the second focus lens at the focus expected position corresponding to the focus position of the first photographing optical system in the second photographing optical system, a focus position while moving the second focus lens in the second search area narrower than the first search area including the focus expected position so as to eliminate an individual difference between the second photographing optical system and the first photographing optical system and then moves the second focus lens to the focus position and stops the second focus lens in the focus position.

As a result, the individual difference between the first photographing optical system and the second photographing optical system is eliminated and the first focus lens and the second focus lens are respectively positioned in accurate focus positions. In this case, since a distance in which the second focus lens is caused to perform search is limited to a range shorter than the first search, the AF search ends in substantially the same degree of time as in the past without requiring very long time.

A second photographing apparatus to obtain the object includes:

a first photographing section that includes a first photographing optical system which includes a first focus lens, a first focus lens driving section which moves the first focus lens in an optical axis direction, and a first imaging element which receives subject light obtained by focusing a subject with the first photographing optical system and generates an image signal representing the subject;

a second photographing section that includes a second photographing optical system which includes a second focus lens, a second focus lens driving section which moves the second focus lens in an optical axis direction, and a second imaging element which receives subject light obtained by focusing the subject with the second photographing optical system and generates an image signal representing the subject;

a deviation storing section that stores, in a nonvolatile manner, a deviation of a focus position of the second focus lens from a focus position of the first focus lens; and a focus position determining section that, for the first photographing optical system, searches for the focus position while moving the first focus lens, and stops the first focus lens at the focus position and, for the second photographing optical system, moves the second focus lens to a position more deviated by the deviation stored in the deviation storing section than a focus expected position of the second focus lens corresponding to the focus position of the first focus lens.

In the deviation storing section, for example, when this photographing apparatus is manufactured, a deviation of focus positions indicating an individual difference between the first photographing section and the second photographing section may be stored in advance.

With the second photographing apparatus of the present invention, for the first photographing optical system, the focus position determining section executes AF search in a predetermined first search area, and, for the second photographing optical system, without positioning the second focus lens in the focus expected position detected in the AF search on the first photographing section side, moves the second focus lens to the position more deviated by the deviation stored in the deviation storing section than the focus expected position and stops the second focus lens in the position.

In other words, the focus position determining section moves, without directly positioning the second focus lens at the focus expected position corresponding to the focus position of the first photographing optical system in the second photographing optical system, the second focus lens to the position more deviated by the deviation stored in the deviation storing section than the focus expected position so as to eliminate an individual difference between the second photographing optical system and the first photographing optical system and stops the second focus lens at the position. As a result, the individual difference between the first photographing optical system and the second photographing optical system is eliminated and the first focus lens and the second focus lens are respectively positioned at accurate focus positions. In this case, the AF search ends in substantially the same time as in the past.

A third photographing apparatus to obtain the object includes:

a first photographing section that includes a first photographing optical system which includes a first focus lens, a first focus lens driving section which moves the first focus lens in an optical axis direction, and a first imaging element which receives subject light obtained by focusing a subject with the first photographing optical system and generates an image signal representing the subject;

a second photographing section that includes a second photographing optical system which includes a second focus lens, a second focus lens driving section which moves the second focus lens in an optical axis direction, and a second imaging element which receives subject light obtained by focusing the subject with the second photographing optical system and generates an image signal representing the subject;

a focus position determining section that, while instructing the first and second focus lens driving sections to respectively move the first and second focus lenses in the optical axis directions, searches for respective focus positions and stops the first and second focus lenses respectively in the focus positions; and a deviation storing section that stores a deviation of the focus position of the second focus lens searched by the focus position determining section from the focus position of the first focus lens searched by the focus position determining section, wherein when the deviation is stored in the deviation storing section, for the first photographing optical system, the focus position determining section searches for a focus position while moving the first focus lens and stops the first focus lens at the focus position and, for the second photographing optical system, the focus position determining section moves the second focus lens to a position more deviated by the deviation stored in the deviation storing section than a focus expected position of the second focus lens corresponding to the focus position of the first focus lens.

The case in which the deviation is stored in the deviation storing section indicates, for example, when the deviation storing section includes a volatile memory, a case of second and subsequent photographing after a power supply is once turned off and a power supply switch is turned on again.

Therefore, in the third photographing apparatus of the present invention, for example, for initial photographing, first, the focus position determining section instructs the first and second focus lens driving sections to search for, while respectively moving the first and second focus lenses in optical axis directions, focus positions of the first and second focus lenses and stops the first and second focus lenses in the respective focus positions. A deviation from the focus position of the first focus lens of the focus position found during this initial photographing of the second focus lens is stored in the deviation storing section. In second and subsequent photographing, for the first photographing optical system, the focus position determining section executes AF search in a predetermined first search area, and, for the second photographing optical system, moves the second focus lens to the position more deviated by the deviation stored in the deviation storing section so as to eliminate an individual difference between the second photographing optical system and the first photographing optical system and stops the second focus lens at the position.

As a result, the individual difference between the first photographing optical system and the second photographing optical system is eliminated in all numbers of times of photographing. The first focus lens and the second focus lens are respectively positioned in accurate focus positions. During the initial photographing, since a distance in which the second focus lens is caused to perform search is limited to a range shorter than the first search, the AF search ends in substantially the same degree of time as in the past without requiring very long time. After the initial photographing, the AF search ends in substantially the same time as in the past.

In the above explanation, the second and subsequent photographing after power-on is described as an example of the case in which the deviation is stored in the deviation storing section. However, the case in which the deviation is stored in the deviation storing section includes, for example, such a case that, after photographing is performed once and a deviation is stored in the deviation storing section after a zoom switch is operated and a focal length is changed, photographing is performed again at the same focal length.

In addition, when the deviation storing section includes, for example, a nonvolatile memory, for example, in some case, contents of the nonvolatile memory are erased by a reset operation. In a case of such configuration, second and subsequent photographing after the reset corresponds to the case in which the deviation is stored.

Here, it is preferable that both the first photographing optical system and the second photographing optical system are variable in focal length and are adjusted to a same focal length, and the deviation storing section stores the deviation for each of the plural focal lengths.

Thus, even if the zoom switch is operated by the user and the focal length is changed, both the first and second focus lenses are positioned in accurate focus positions by using a deviation corresponding to the focal length.

In addition, it is preferable that the first photographing optical system and the second photographing optical system are positioned side by side and generate image signals for a stereoscopic view.

Thus, in the first photographing optical system and the second photographing optical system, a focused image signal for right eye and a focused image signal for left eye are respectively obtained.

A first focus position determining method to obtain the object is a focus position determining method in a photographing apparatus including two photographing sections of: a first photographing section that includes a first photographing optical system which includes a first focus lens, a first focus lens driving section which moves the first focus lens in an optical axis direction, and a first imaging element which receives subject light obtained by focusing a subject with the first photographing optical system and generates an image signal representing the subject; and a second photographing section that includes a second photographing optical system which includes a second focus lens, a second focus lens driving section which moves the second focus lens in an optical axis direction, and a second imaging element which receives subject light obtained by focusing the subject with the second photographing optical system and generates an image signal representing the subject, the focus position determining method comprising:

a first step including searching for a focus position while moving the first focus lens in a predetermined first search area, and stopping the first focus lens at the focus position; and a second step including searching for a focus position while moving the second focus lens in a second search area narrower than the first search area including a focus expected position of the second focus lens corresponding to the focus position of the first focus lens, and stopping the second focus lens at the focus position.

With the first focus position determining method of the present invention, a focus position is searched while the second focus lens is moved in the second search area narrower than the first search area including the focus expected position of the second focus lens corresponding to the focus position of the first focus lens. Therefore, the first and second focus lenses are respectively positioned in accurate focus positions. As a result, an individual difference between the first photographing optical system and the second photographing optical system is eliminated. The first focus lens and the second focus lens are respectively positioned in accurate focus positions. In this case, since a distance in which the second focus lens is caused to perform search is limited to a range shorter than the first search, the AF search ends in substantially the same degree of time as in the past without requiring very long time.

A second focus position determining method to obtain the object is a focus position determining method in a photographing apparatus including two photographing sections of: a first photographing section that includes a first photographing optical system which includes a first focus lens, a first focus lens driving section which moves the first focus lens in an optical axis direction, and a first imaging element which receives subject light obtained by focusing a subject with the first photographing optical system and generates an image signal representing the subject; and a second photographing section that includes a second photographing optical system which includes a second focus lens, a second focus lens driving section which moves the second focus lens in an optical axis direction, and a second imaging element which receives subject light obtained by focusing the subject with the second photographing optical system and generates an image signal representing the subject, and the photographing apparatus further including a deviation storing section that stores, in a nonvolatile manner, a deviation of a focus position of the second focus lens from a focus position of the first focus lens, the focus position determining method comprising:

a first step including searching for a focus position while moving the first focus lens and stopping the first focus lens at the focus position; and a second step including moving the second focus lens to a position more deviated by the deviation stored in the deviation storing section than a focus expected position of the second focus lens corresponding to the focus position of the first focus lens.

With the second focus position determining method of the present invention, the second focus lens is positioned in the position more deviated by the deviation stored in the deviation storing section than the focus expected position of the second focus lens corresponding to the focus position of the first focus lens. Therefore, an individual difference between the first focus lens and the second focus lens is eliminated in the same time as in the past. Both the focus lenses are positioned at accurate focus positions.

A third focus position determining method to obtain the object is a focus position determining method in a photographing apparatus including two photographing sections of: a first photographing section which includes a first photographing optical system including a first focus lens, a first focus lens driving section which moves the first focus lens in an optical axis direction, and a first imaging element which receives subject light obtained by focusing a subject with the first photographing optical system and generates an image signal representing the subject; and a second photographing section that includes a second photographing optical system which includes a second focus lens, a second focus lens driving section which moves the second focus lens in an optical axis direction, and a second imaging element which receives subject light obtained by focusing the subject with the second photographing optical system and generates an image signal representing the subject, and the photographing apparatus further including a deviation storing section that stores a deviation of a focus position of the second focus lens from a focus position of the first focus lens, the focus position determining method comprising:

a first step including searching for focus positions while instructing the first and second focus lens driving sections to respectively move the first and second focus lenses in the optical axis directions and stopping the first and second focus lenses at the respective focus positions;

a second step including causing the deviation storing section to store a deviation of the focus position of the second focus lens searched by performing the first step from the focus position of the first focus lens searched by performing the first step; and a third step being performed instead of the performing the first step and the second step when the deviation is stored in the deviation storing section, the third step including, for the first photographing optical system, searching for a focus position while moving the first focus lens and stopping the first focus lens at the focus position and, for the second photographing optical system, moving the second focus lens to a position more deviated by the deviation stored in the deviation storing section than a focus expected position of the second focus lens corresponding to the focus position of the first focus lens.

With the third focus position determining method of the present invention, for example, for initial photographing, a focus position is searched while the second focus lens is moved in the second search area narrower than the first search area including the focus expected position of the second focus lens corresponding to the focus position of the first focus lens. Therefore, the first and second focus lenses are respectively positioned in accurate focus positions. As a result, an individual difference between the first photographing section and the photographing section is eliminated. The first focus lens and the second focus lens are respectively arranged in accurate focus positions. In this case, since a distance in which the second focus lens is caused to perform search is limited to a range shorter than the first search, the AF search ends in substantially the same degree of time as in the past without requiring very long time.

Further, the deviation acquired in the initial photographing is stored in the deviation storing section. For second and subsequent photographing, the second focus lens is arranged in the position more deviated by the deviation stored in the deviation storing section than the focus expected position of the second focus lens corresponding to the focus position of the first focus lens. Therefore, an individual difference between the first photographing section and the second photographing section is eliminated. The first focus lens and the second focus lens are respectively positioned at accurate focus positions. In this case, the AF search ends in the same time as in the past.

Advantageous Effects

As explained above, a photographing apparatus that may accurately determine focus positions of two photographing sections in the same degree of time as in the past and a focus position determining method in the photographing apparatus are obtained.

BRIEF DESCRIPTION OF DRAWINGS

FIG. 5 is a flowchart illustrating a processing procedure for a focus position determination executed by the main CPU 100 in cooperation with the AF detecting section 120.

FIGS. 13A and 13B are a flowchart illustrating a processing procedure of focus position determination executed by the main CPU 100 in cooperation with the DSP included in the AF detecting section and the like.

BEST MODE FOR CARRYING OUT THE INVENTION

Embodiments of the present invention are explained below.

Figure 1A:
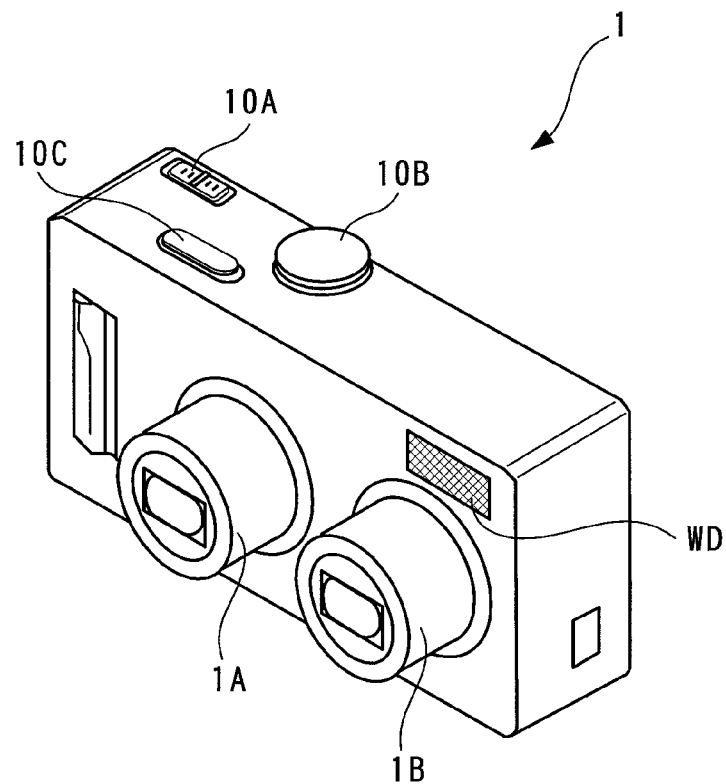
FIGS. 1(a) and 1(b) are diagrams illustrating a photographing apparatus according to an embodiment of the present invention.
Figure 1B:
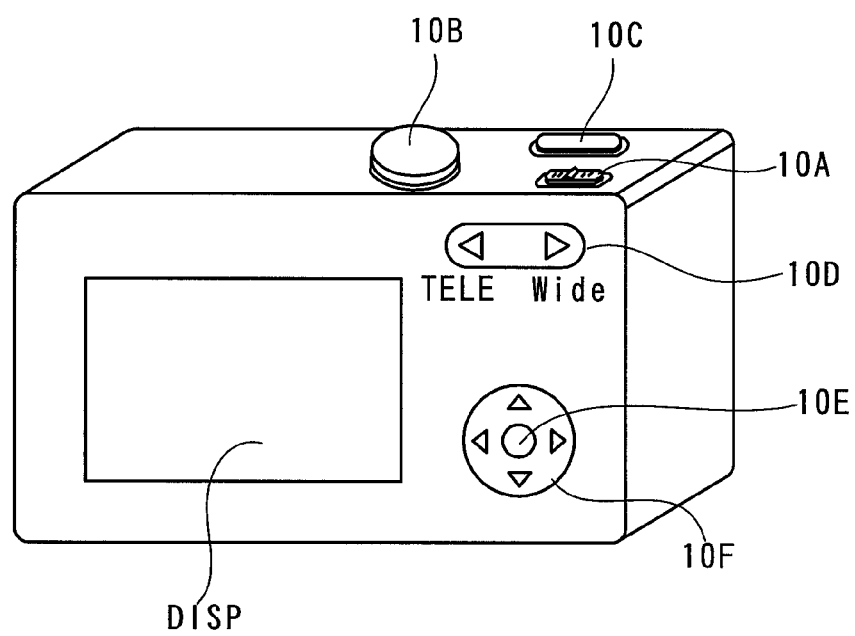

FIGS. 1(a) and 1(b) are diagrams illustrating a photographing apparatus according to an embodiment of the present invention.

In FIG. 1(a), a perspective view of a photographing apparatus 1 viewed from obliquely above is illustrated.

The photographing apparatus 1 illustrated in FIG. 1(a) includes two photographing sections 1A and 1B. In the following explanation, the two photographing sections are described as first photographing section 1A and second photographing section 1B to be distinguished.

The first photographing section 1A and the second photographing section 1B are arranged side by side to be capable of generating image signals for stereoscopic view. Image signals for right eye and left eye are respectively generated by the photographing sections 1A and 1B. When a power switch 10A located on an upper surface of the photographing apparatus 1 illustrated in FIGS. 1(a) and 1(b) is operated, a photographing mode dial 10B is set to, for example, a stereoscopic mode, and a shutter button 10C is operated, image data for stereoscopic view are generated by both the photographing sections 1A and 1B.

The shutter button 10C included in the photographing apparatus 1 according to this embodiment has two operation forms of half press and full press. In this photographing apparatus 1, exposure adjustment and focus adjustment are carried out when the shutter button 10C is half-pressed. Photographing is carried out when the shutter button 10C is full-pressed. A flash light emitting window WD that emits flash light to a subject when field luminance is low is provided above the photographing section 1B.

As illustrated in FIG. 1(b), a monitor DISP capable of performing three-dimensional display is provided on a rear surface. The same subject captured by both the photographing sections 1A and 1B is displayed as a stereoscopic image on the monitor DISP. Further, operation members such as a zoom switch 10D, a menu/OK button 10E, and a cross key 1 OF are disposed. In the following explanation, in some case, the power switch 10A, the shutter button 10C, the mode dial 10B, the zoom switch 10D, the menu/OK button 10E, the cross key 10F, and the like are collectively referred to as operation section 10.

Figure 2A:
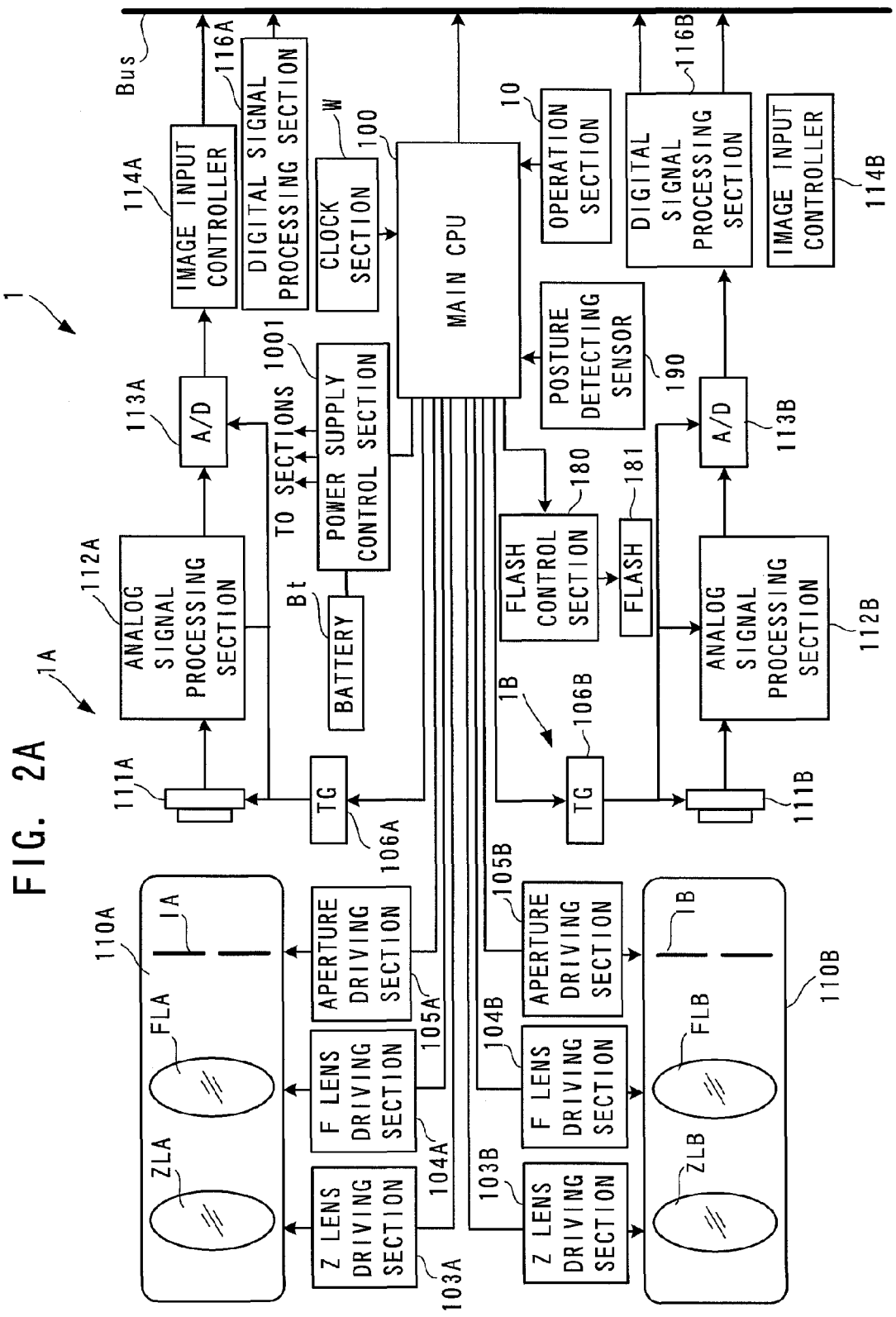
FIGS. 2A and 2B are a block diagram illustrating the configuration of the inside of the photographing apparatus 1 illustrated in FIGS. 1(a) and 1(b).
Figure 2B:
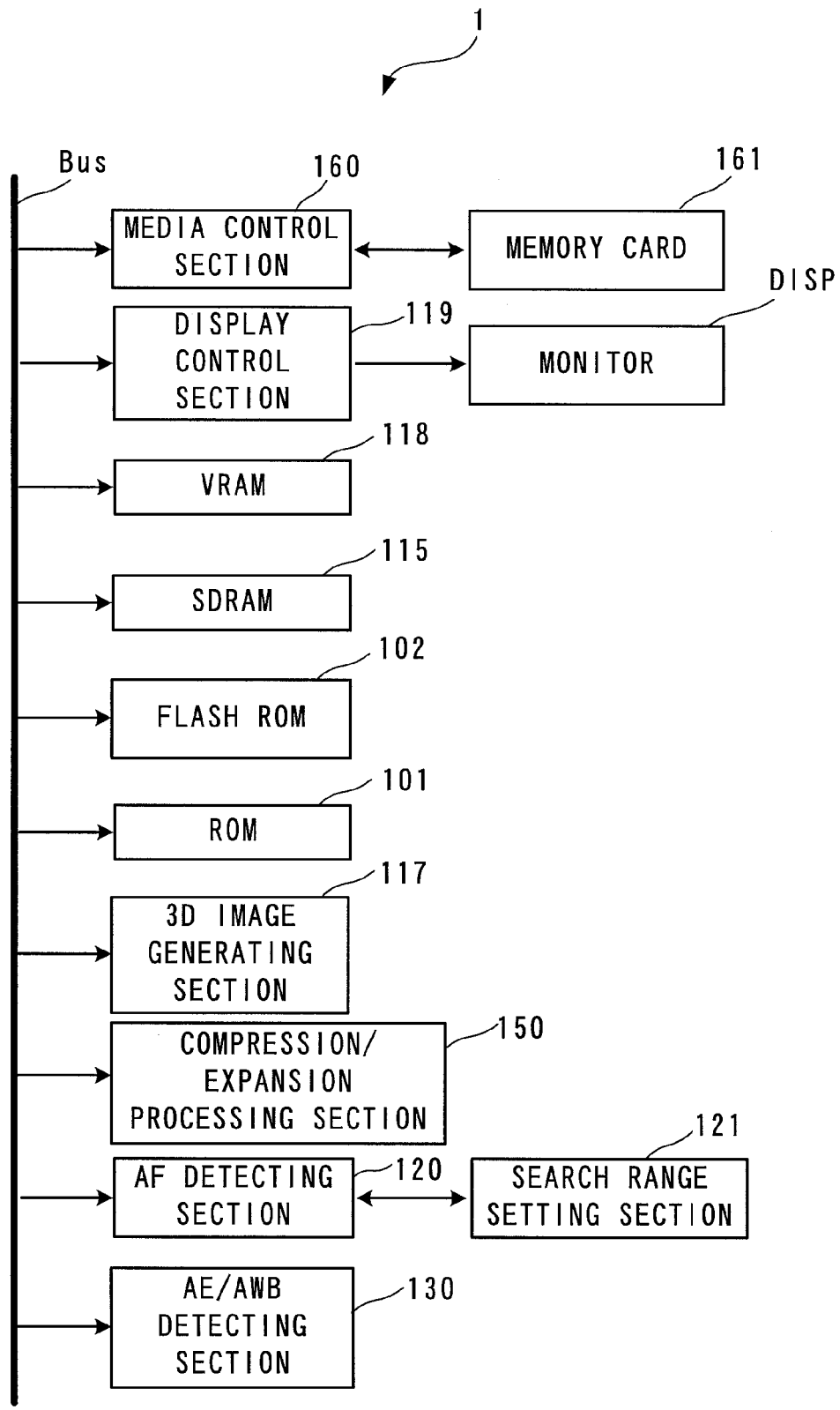

FIGS. 2A and 2B are a block diagram illustrating the configuration of the inside of the photographing apparatus 1 illustrated in FIGS. 1(a) and 1(b).

The configuration of the inside of the photographing apparatus 1 will be explained with reference to FIGS. 2A and 2B.

An operation of this photographing apparatus 1 is collectively controlled by a main CPU 100.

A ROM 101 is connected to the main CPU 100 via a bus Bus. A program necessary for this photographing apparatus 1 to operate is stored in the ROM 101. The main CPU 100 collectively controls the operation of this photographing apparatus 1 according to a procedure of this program.

First, when the power switch 10A in the operation section 10 illustrated in FIGS. 1(a) and 1(b) is operated, the main CPU 100 controls a power supply control section 1001 to supply electric power from a battery BT to each section illustrated in FIGS. 2A and 2B through the power supply control section 1001 and shifts this photographing apparatus 1 to an operating state. In this way, the main CPU 100 starts photographing processing. It is assumed that an AF detecting section 120, a search range setting section 121, an AE/AWB detecting section 130, an image input controller 114A, a digital signal processing section 116A, and a 3D image generating section 117 are included in a processor such as a DSP (Digital Signal Processor) and the main CPU 100 executes processing in cooperation with the DSP. It is assumed that a display control section 119 and the monitor DISP include LCDs.

Here, the configuration of the inside of the first photographing section 1A and the second photographing section 1B explained with reference to FIGS. 1(a) and 1(b) above will be explained with reference to FIGS. 2A and 2B. Component members of the first photographing section 1A are explained with a word 'first' affixed thereto and component members of the second photographing section 1B are explained with a word 'second' affixed thereto.

The first photographing section 1A includes a first photographing optical system 110A including a first focus lens FLA, a first focus lens driving section (hereinafter referred to as first F lens driving section) 104A that moves the first focus lens FLA in an optical axis direction, and a first imaging element 111A that receives a subject light, which is obtained by focusing a subject with the first photographing optical system, and generates an image signal representing the subject. Besides, a first aperture IA is disposed in this first photographing optical system 110A. The first photographing optical system 110A includes a first aperture driving section 105A that changes an aperture diameter of the first aperture IA.

In addition, this first photographing optical system 110A is formed as a zoom lens. The first photographing optical system 110A also includes a Z lens driving section 103A that performs control for setting the zoom lens to a predetermined focal length. In FIGS. 2A and 2B, it is schematically indicated by one lens ZL that the entire photographing optical system is the zoom lens.

On the other hand, like the first photographing section 1A, the second photographing section 1B includes a photographing optical system including a second focus lens FLB, a second focus lens driving section (hereinafter referred to as second F lens driving section) that moves the second focus lens FLB in an optical axis direction, and a second imaging element 111B that receives a subject light, which is obtained by focusing a subject with the second photographing optical system, and generates an image signal representing the subject.

Image signals for stereoscopic view are generated by the first photographing section 1A and the second photographing section 1B. Specifically, an image signal for right eye is generated by the first photographing section 1A and an image signal for left eye is generated by the second photographing section 1B.

The configurations of the first photographing section 1A and the second photographing section 1B are the same except that the first photographing section 1A generates the image signal for right eye while the second photographing section 1B generates the image signal for left eye. Processing after the image signals of both the photographing sections are converted into digital signals by a first A/D 113A and a second A/D 113B and led to the bus Bus is the same in the first photographing section 1A and the second photographing section 1B. Therefore, the configuration of the first photographing section 1A is explained according to a flow of the image signal.

First, an operation in directly displaying a subject captured by the first photographing section 1A on the monitor DISP as a through image will be explained.

In response to an operation of the power switch 10A in the operation section 10, the main CPU 100 controls the power supply control section 1001 to supply electric power from the battery BT to the sections and shifts this photographing apparatus 1 to the operating state.

First, the main CPU 100 controls the F lens driving section 104A and the aperture driving section 105A to start exposure and adjustment of a focus. The main CPU 100 instructs a TG 106A to set an electronic shutter in the imaging element 111A and output an image signal from the imaging element 111A to the analog signal processing section 112A, for example, at every 1/60 second.

The analog signal processing section 112A receives supply of a timing signal from the TG 106A, receives supply of the image signal at every 1/60 second from the imaging element 111A, performs noise reduction processing or the like, and supplies an analog image signal subjected to the noise reduction processing to the A/D 113A at the next stage. The A/D 113A also performs conversion processing of an analog image signal into a digital image signal at every 1/60 second in synchronization with the timing signal from the TG 106A. The digital image signal converted and output by the A/D 113A in this way is led to the bus Bus at every 1/60 second by the image input controller 114A. The image signal led to the bus Bus is stored in an SDRAM 115. Since the image signal is output from the imaging element 111A at every 1/60 second, contents of this SDRAM 115 are rewritten at every 1/60 second.

The image signals stored in the SDRAM 115 are respectively read out at every 1/60 by the DSP including in the AF detecting section 120, the AE/AWB detecting section 130, and the digital signal processing section 116A.

The AF detecting section 120 detects contrast and carries out AF search at every 1/60 while the main CPU 100 controls the F lens driving section 104A to move the focus lens FLA. The main CPU 100 instructs, on the basis of a detection result of the AF detecting section 120, the F lens driving section 104A to move the first focus lens FLA to a focus position and to stop the first focus lens FLA at the focus position. Therefore, a focus is immediately adjusted irrespective of which direction the first photographing section 1A is faced. Thus, a focused subject is almost always displayed on the monitor DISP.

In addition, the AE/AWB detecting section 130 performs, at every 1/60, detection of luminance and calculation of a gain set in a white balance amplifier in the digital signal processing section 116A. The main CPU 100 controls the aperture driving section 105A according to a detection result of luminance of this AE/AWB detecting section 130 to change the opening diameter of the aperture I. The digital signal processing section 116A receives the detection result from the AE/AWB detecting section 130 and sets the gain of the white balance amplifier.

This digital signal processing section 116A performs processing for changing an image signal to an image signal suitable for display. The image signal converted into the image signal suitable for display by the signal processing of the digital signal processing section 116A is supplied to the 3D image generating section 117. The 3D image generating section 117 generates an image signal for right eye for display. The generated image signal for right eye is stored in a VRAM 118.

An operation same as the operation explained above is also performed by the second photographing section 1B at the same timing Therefore, two kinds of image signals for right eye and left eye are stored in the VRAM 118.

The main CPU 100 transfers the image signal for right eye and the image signal for left eye in the VRAM 118 to the display control section 119 and causes the display control section 119 to display an image on the monitor DISP. When the image signal for right eye and the image signal for left eye are displayed to be superimposed on the monitor DISP illustrated in FIGS. 1(a) and 1(b), the image on the monitor DISP may be stereoscopically seen for the human eyes. Since the first and second imaging elements 111A and 111B continue to be caused to output an image signal at every 1/60, an image signal in the VRAM 118 is rewritten at every 1/60 and a stereoscopic image on the monitor DISP is also switched and displayed at every 1/60 and the stereoscopic image is displayed as a moving image.

Here, when the subject on the monitor DISP is referred to and the shutter button 10C in the operation section 10 is half-pressed, the main CPU 100 receives an AE value outputted immediately before the shutter button 10C is full-pressed in the AE/AWB detecting section 130, instructs the first and second aperture driving sections 105A and 105B to set the first and second apertures IA and IB to a diameter corresponding to the AE value and causes the AF detecting section 120 to perform detection of contrast while instructing the first F lens driving section 104A to move the first focus lens FLA in a first search area. When the maximum of the contrast is detected by the AF detecting section 120, the main CPU 100 receives a focus position P1 where the maximum of the contrast is obtained and stops the first focus lens FLA in the focus position P1.

On the other hand, for the second photographing optical system, the main CPU 100 causes the AF detecting section 120 to search for a focus position while causing the second focus lens FLB in a second search area narrower than the first search area including a focus expected position of the second focus lens FLB corresponding to the focus position of the first focus lens FLA. The main CPU 100 receives a search result from the AF detecting section 120 and stops the second focus lens FLB at the focus position indicated by the search result. As explained in detail later, in this case, the AF detecting section 120 causes the search range setting section 121 to calculate the second search area narrower than the first search area including a focus expected position corresponding to the focus position of the first focus lens on the basis of the focus position P1 of the first focus lens FLA and data (a near side deviation N and a far side deviation F) indicating a search area read out from a flash ROM 102. The main CPU 100 receives a calculation result of the second search area and instincts the second F lens driving section 104B to perform AF search for searching for a focus position in the second search area.

Even if the focus lens FLA of the first photographing section 1A is caused to perform the same AF search as in the past and the second photographing section 1B is caused to perform the AF search in the second area narrower than the first area including the focus expected position of the second focus lens FLB, the second photographing section 1B only needs to be caused to perform the AF search in a short range across the focus expected position. Therefore, the AF search ends in substantially the same time as in the past.

When the shutter button 10C is full-pressed, the main CPU 100 causes the first and second TG's 106A and 106B to set an electronic shutter and starts photographing processing for a still image. The main CPU 100 causes the first and second imaging elements 111A and 111B to output image signals to the first and second analog signal processing sections 112A and 112B at off timing of the electronic shutter and causes the first and second analog signal processing sections 112A and 112B to perform noise reduction processing. Thereafter, the main CPU 100 causes the first and second A/D's 113A and 113B to convert analog image signals into digital image signals. In this time, gains are set to white balance amplifiers in the first and second digital signal processing sections 116A and 116B on the basis of white balance information detected immediately before the full press by the AE/AWB detecting section 130. And thus, appropriate white balance adjustment is performed.

According to an instruction of the main CPU 100, the first and second image input controllers 114A and 114B lead the digital image signals converted by the first and second A/Ds 113A and 113B to a Bus side and once store all the image signals in the SDRAM 115 through the Bus. Thereafter, this time, the digital signal processing sections 116A and 116B read out an image signal of the SDRAM 115, convert the image signal into an image signal suitable for display, and transfer the converted image signal to the 3D image generating section 117. After an image signal for right eye and an image signal for left eye suitable for display are generated by the first and second digital signal processing sections 116A and 116B and an image signal for right eye and an image signal for left eye for display to be displayed on the monitor DISP are generated by the 3D image generating section 117 in this way, the main CPU 100 supplies the image signal for right eye and the image signal for left eye in the 3D image generating section 117 to a compression/expansion processing section 150 using the Bus. After causing this compression/expansion processing section 150 to perform compression of image data, the main CPU 100 transfers the compressed image data to a media control section 160 using the Bus and supplies header information related to the compression and photographing to the media control section 160 and causes the media control section 160 to generate an image file and to record the image file in a memory card 161.

When the configuration of this embodiment is adopted, even if there is an individual difference between the first photographing section 1A and the second photographing section 1B, the individual difference is eliminated and the first and second focus lenses of the photographing optical systems are respectively positioned in accurate focus positions in substantially the same time as in the past. Incidentally, in FIGS. 2A and 2B, other elements such as, a flash control section 180, a flash 181 that receives an instruction from the flash control section 180 and emits flash light from the light emitting window WD illustrated in FIGS. 1(a) and 1(b), a clock section W for detecting the present time, and a posture detecting sensor 190 that detects the posture of this photographing apparatus 1 are illustrated.

In this embodiment, an example of the focus position determining section according to the present invention includes the main CPU 100, the first and second F lens driving sections 104A and 104B, the first and second focus lenses FLA and FLB, the flash ROM 102, the AF detecting section 120, and the search range setting section 121.

In order to further facilitate understanding of the operations explained above, a focus position determining method that the main CPU 100 causes the AF detecting section 120 to perform while instructing the first and second F lens driving sections 104A and 104B to move the first and second focus lenses is plainly explained with reference to FIGS. 3 and 4.

FIG. 3 is a diagram for explaining the focus position determining method that the main CPU 100 causes the AF detecting section 120 to perform while instructing the first F lens driving section 104A and the second F lens driving section 104B to move the first and second focus lenses FLA and FLB. FIG. 4 is a diagram for explaining processing contents of the search range setting section.

Figure 3A:
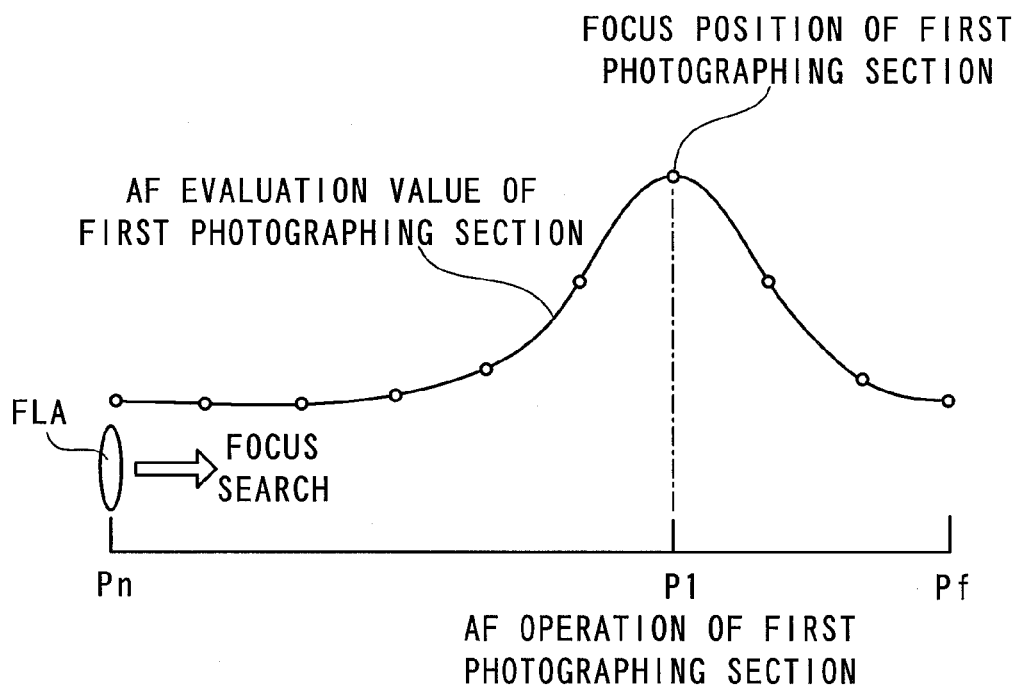
FIGS. 3(a) and 3(b) are diagrams for explaining a focus position determining method that a main CPU 100 causes an AF detecting section 120 to perform while instructing a first F lens driving section 104A and a second F lens driving section 104B to move first and second focus lenses.
Figure 3B:
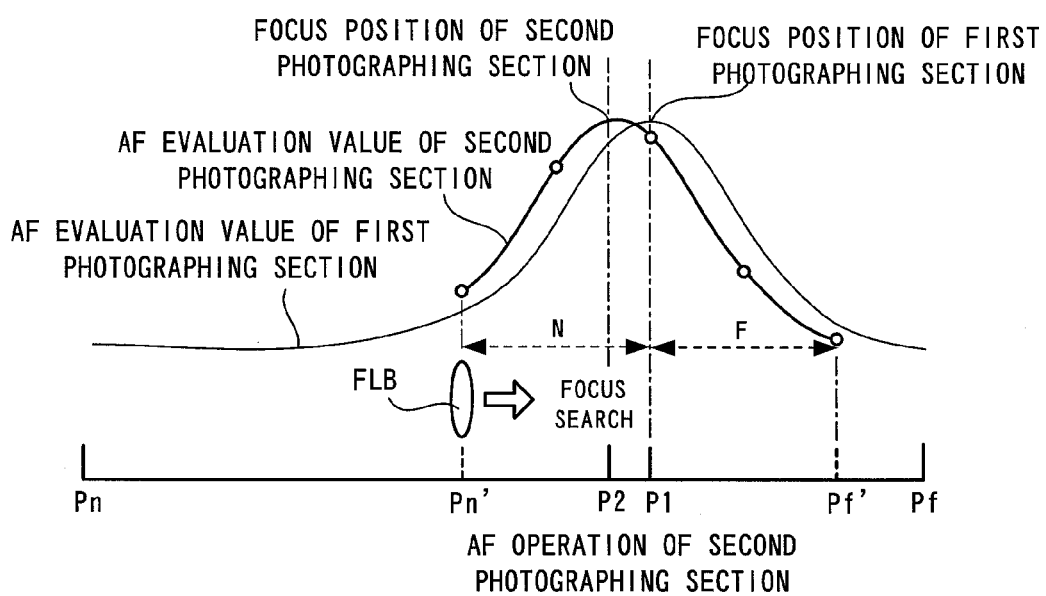

A first search area of the first focus lens FLA is illustrated in FIG. 3(a). A second search area of the second focus lens FLB is illustrated in FIG. 3(b).

As illustrated in FIG. 3(a), the main CPU 100 causes the AF detecting section 120 to detect the maximum of contrast to thereby search for a focus position while causing the first F lens driving section 104A to move the first focus lens FLA in a first search area (Pn to Pf). The main CPU 100 receives the focus position P1 where an AF evaluation value (contrast) detected by the AF detecting section 120 is the maximum and instructs the first F lens driving section 104A to move the focus lens FLA to the focus position P1 and stop the focus lens FLA in the focus position P1.

Thereafter, the AF detecting section 120 inputs the focus position P1 to the search range setting section 121, reads out constants (the near side deviation N and the far side deviation F) as to a second search area from the flash ROM 102, transfers the constants to the search range setting section 121, and causes the search range setting section 121 to calculate the second search area. The main CPU 100 receives a result of the calculation via the bus Bus and causes the AF detecting section 120 to search for a focus position while instructing the second F lens driving section 104B to move the second focus lens FLB in a second search range (Pn' to Pf').

The main CPU 100 receives a focus position P2 where the AF evaluation value (contrast) of the second photographing section 1B detected by the AF detecting section 120 is the maximum and instructs the second F lens driving section 104B to stop the focus lens FLB at the focus position P2.

Figure 4:
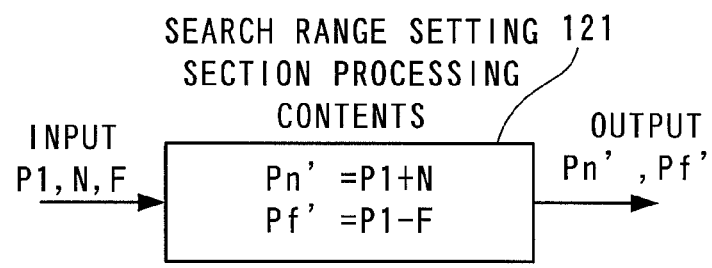
FIG. 4 is a diagram for explaining processing contents of a search range setting section.

Specifically, as illustrated in FIG. 4, the search range setting section 121 calculates a search start position Pn' from an equation Pn'=Pn+N and calculates a search end position Pf' from an equation Pf'=P1−F on the basis of the focus position P1 of the first focus lens FLA detected by the AF detecting section 120 and the near side deviation N and the far side deviation F stored in advance in the flash ROM 102 the search start position Pn' and the search end position Pf' defining the second search area. Incidentally, it is assumed that, in the flash ROM 102, plural combinations of data each representing the near side deviation N and the far side deviation F are stored for each of focal lengths and for each of focus positions such that an individual difference between the first photographing section 1A and the second photographing section 1B may be eliminated.

The main CPU 100 receives a result of the calculation and causes the AF detecting section 120 to search for the focus position P2 while instructing the second F lens driving section 104B to move the second focus lens FLB in the second search area (Pn' to Pf') narrower than the first search area, receives the found focus position, and instructs the second lens driving section 104B to position the second focus lens FLB.

When this configuration is adopted, the second focus lens FLB only needs to be caused to perform AF search in the narrow second search area including the focus expected position corresponding to the focus position of the first focus lens FLA. Therefore, accurate focus position determination with the individual difference between both the photographing sections eliminated is performed in time substantially the same as the AF time in the past.

Lastly, a procedure of focus position determination processing executed by the main CPU 100 and the DSP included in the AF detecting section 120 and the search range setting section 121 in cooperation with each another is explained with reference to a flowchart.

FIG. 5 is a flowchart illustrating a processing procedure for a focus position determination executed by the main CPU 100 in cooperation with the DSP included in the AF detecting section 120 and the AE/AWB detecting section 130.

In step S501, the main CPU 100 determines whether the shutter button 10C is half-pressed. When the main CPU 100 determines in step S501 that the shutter button 10C is not half-pressed, the main CPU 100 proceeds to a No side and repeats the processing in step S501. When the main CPU 100 determines in step S501 that the shutter button 10C is half-pressed, the main CPU 100 proceeds to a Yes side. When the main CPU 100 proceeds to the Yes side, in step S502, the AE/AWB detecting section 130 in the DSP receives a processing start instruction from the main CPU 100 and starts an AE operation. The main CPU 100 further proceeds to step S503 and the AF detecting section 120 in the DSP starts the AF operation.

According to the start of the AF operation in step S503, in step S504, first, the main CPU 100 sets the first search area (Pn to Pf in FIG. 4) in the first F lens driving section 104A. In the next step S505, the main CPU 100 causes the AF detecting section 120 to perform detection of a focus position while moving the first focus lens FLA of the first photographing optical system.

In step S506, the AF detecting section 120 acquires the focus position P1 of the first focus lens FLA in the photographing optical system included in the first photographing section 1A. In response to the acquisition of the focus position P1, the main CPU 100 instructs the first F lens driving section 104A to stop the first focus lens FLA at the first focus position P1.

In the next step S507, the AF detecting section 120 supplies the focus position P1 to the search range setting section 121, reads out search start position data N and search end position data F from the flash ROM 102 and supplies the search start position data N and the search end position data F to the search range setting section 121, and causes the search range setting section 121 to calculate the second search area using the equations Pn'=P1+N and Pf'=P1−F illustrated in FIG. 4. The main CPU 100 receives a result of the calculation and sets a search start position Pn' and a search end position Pf' in the second F lens driving section 104B. In step S508, the main CPU 100 causes the AF detecting section 120 to detect the second focus position P2 while moving the focus lens FLB in the second search range. After causing the AF detecting section 120 to detect the second focus position P2 in step S508, in step S509, the main CPU 100 acquires the focus position P2 from the AF detecting section 120. In step S510, the main CPU 100 instructs the second F lens driving section 104B to move the second focus lens FLB to the focus position P2 and stop the second focus lens FLB at the focus position P2. After ending the AF operation in step S511, in step S512, the main CPU 100 waits for full-press of the shutter button 10C. When the main CPU 100 determines in step S512 that the shutter button 10C is not full-pressed, the main CPU 100 proceeds to a No side and repeats the processing in step S512. When the main CPU 100 determines that the shutter button 10C is full-pressed, the CPU 100 proceeds to a Yes side, executes photographing processing, and ends the processing of this flow.

In this embodiment, the processing from step S504 to step S506 is equivalent to an example of processing in the first step according to the present invention. The processing from step S507 to step S510 is equivalent to an example of processing in the second step according to the present invention.

When the main CPU 100 and the DSP included in the AF detecting section 120 and the search range setting section 121 execute the flow of FIG. 5, determination of an accurate focus position with an individual difference between the first photographing section 1A and the second photographing section 1B is carried out in substantially the same time as in the past.

Figure 6A:
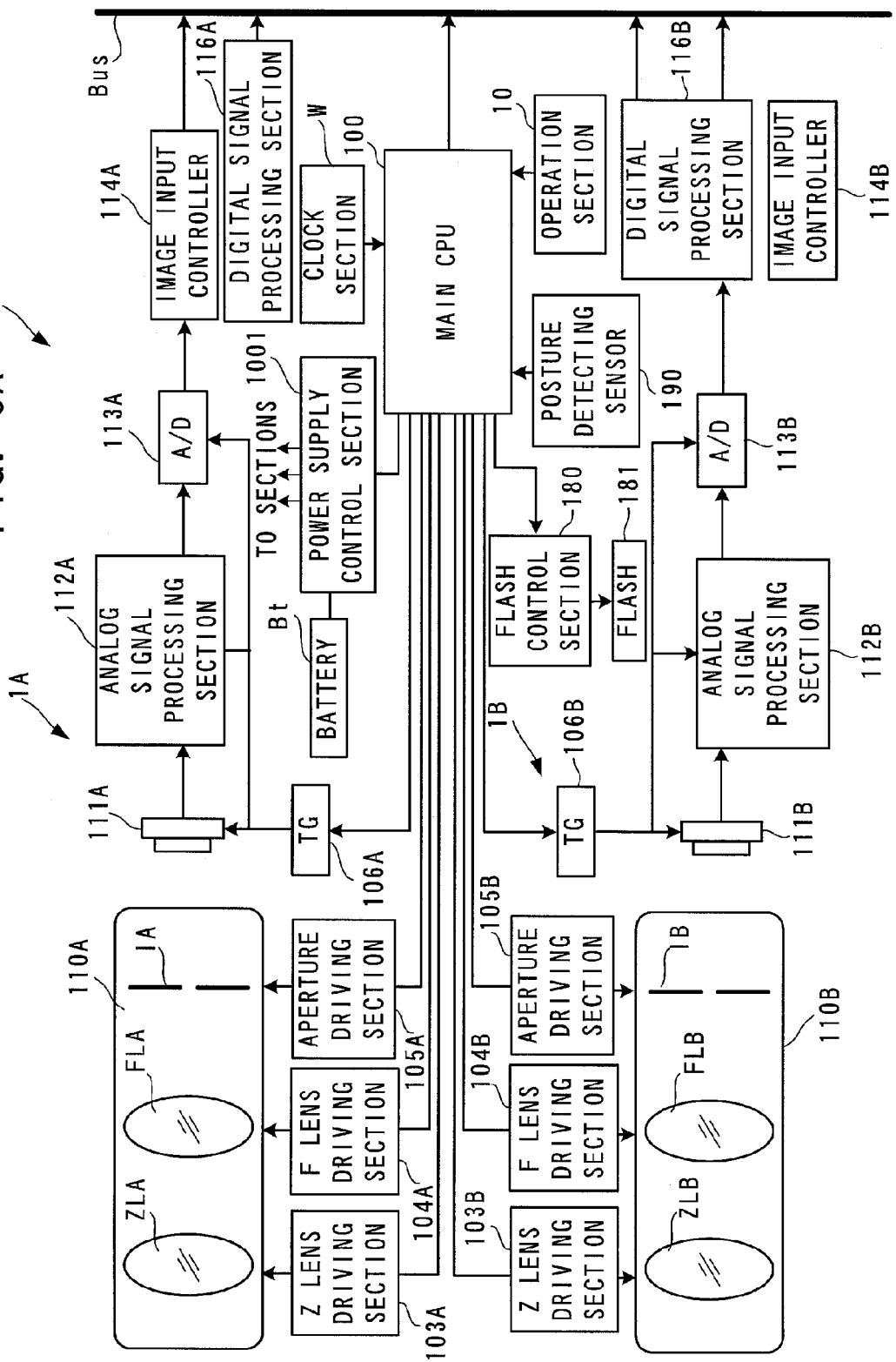
FIGS. 6A and 6B are a diagram illustrating a second embodiment.
Figure 6B:
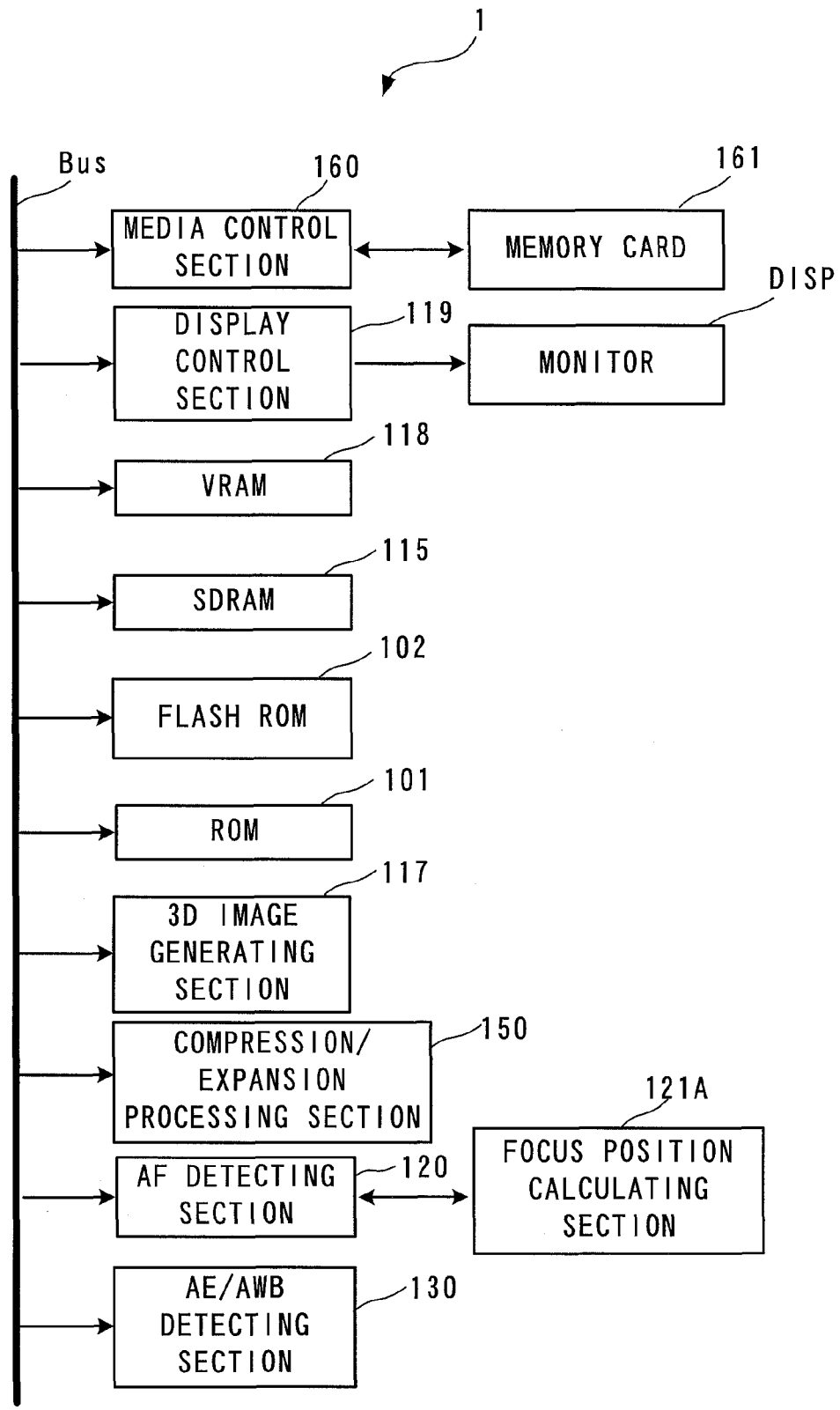

FIGS. 6A and 6B are a diagram illustrating a second embodiment.

It is assumed that the photographing apparatus 1 having the external appearance illustrated in FIGS. 1(a) and 1(b) is also used in this second embodiment. In FIGS. 6A and 6B, a block diagram substantially the same as that in FIGS. 2A and 2B is illustrated. A part of the search range setting section 121 illustrated in FIGS. 2A and 2B is replaced with a focus position calculating section 121A.

Figure 7A:
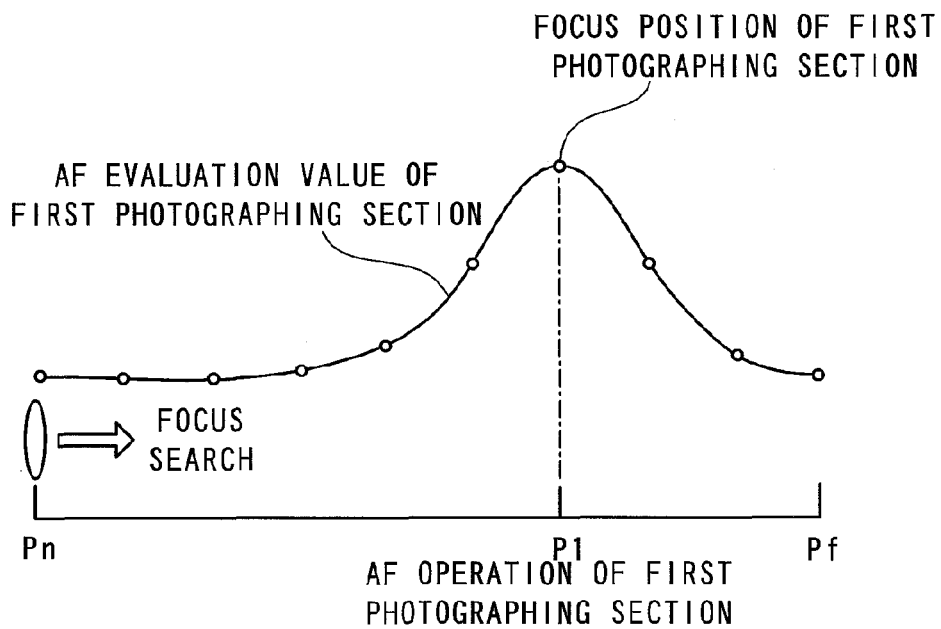
FIGS. 7(a) and 7(b) are diagrams for explaining a focus position determining method which the main CPU 100 causes the AF detecting section 120 to perform, while instructing the first F lens driving section 104A and the second F lens driving section 104B to move first and second focus lenses.
Figure 7B:
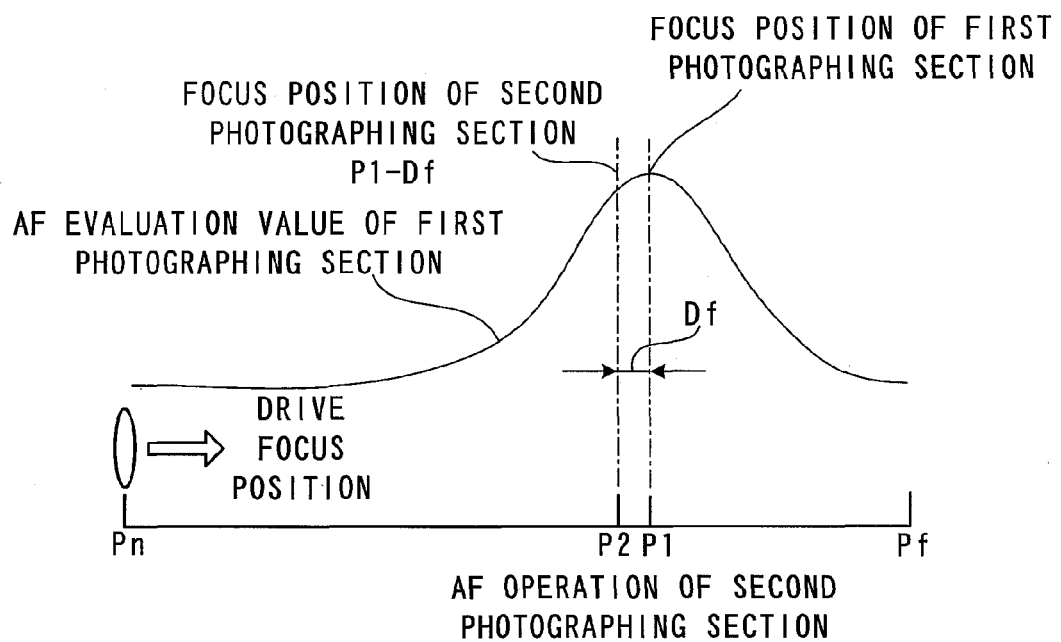
Figure 8:
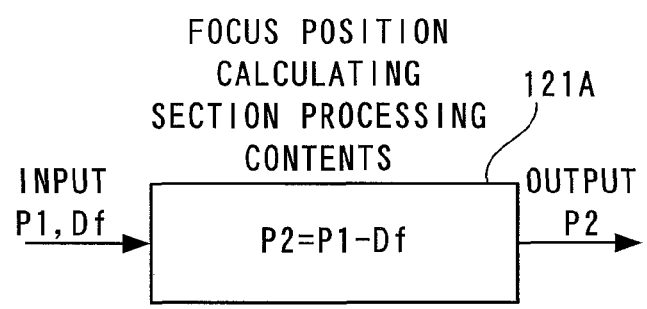
FIG. 8 is a diagram for explaining processing contents of the focus position calculating section 121A.

FIGS. 7(a) and 7(b) are diagrams for explaining a focus position determining method changed to a configuration in which, after causing the AF detecting section 120 to perform search for a focus position while instructing the first F lens driving section 104A to move the first focus lens, for the second focus lens, the main CPU 100 moves the second focus lens FLB to the focus position using the deviation Df in the flash ROM 102 and stops the second focus lens FLB at the focus position. FIG. 8 is a diagram for explaining processing contents of the focus position calculating section 121A.

In the first embodiment, the configuration is proposed in which the main CPU 100 instructs the second F lens driving section 104B to perform the AF search in the short second search area including the focus expected position corresponding to the focus position of the first focus lens while moving the second focus lens FLB, whereby it is possible to eliminate the individual difference and determine an accurate focus position in time substantially the same time as in the past.

On the other hand, in the second embodiment, there is proposed a configuration for acquiring in advance a deviation of focus positions representing an individual difference between the first photographing section 1A and the second photographing section 1B during manufacturing before this photographing apparatus 1 is shipped to the market, storing the deviation in the flash ROM 102, during photographing, causing the AF detecting section 120 to perform detection of the first focus position P1 while moving only the first focus lens, and, for the second focus lens FLB, omitting the AF search performing while moving the second focus lens FLB, causing the focus position calculating section 121A to calculate the second focus position P2 using the deviation Df, and moving the second focus lens to the calculated position and stopping the second focus lens at the calculated position.

When this configuration is adopted, it is possible to eliminate an individual difference and to perform determination of an accurate focus position in substantially the same time as in the past. In the second embodiment, an example of focus position determining section according to the present invention includes the main CPU 100, the first and second F lens driving sections 104A and 104B, the first and second focus lenses FLA and FLB, the flash ROM 102, the AF detecting section 120, and the focus position calculating section 121A.

The second embodiment is explained with reference to FIGS. 7(A) and 7(B).

In FIG. 7(a), a first search area of the first focus lens FLA is illustrated. In FIG. 7(b), it is illustrated that the second focus lens FLB is not caused to perform search and the second focus lens is moved to and stopped in the second focus position P2 that the focus position calculating section 121A is caused to calculate.

As illustrated in FIG. 7(a), the second embodiment is the same as the first embodiment in that the main CPU 100 causes the AF detecting section 120 to detect the focus position P1 while instructing the F lens driving section 104A to move the first focus lens FLA in the first search area (Pn to Pf).

For subsequent determination of a focus position of the second focus lens FLB, the AF detecting section 120 supplies the focus position P1 of the first focus lens to the focus position calculating section 121B, reads out the deviation Df from the flash ROM 102 and supplies the deviation Df to the focus position calculating section 121A, and, after causing the focus position calculating section 121A to calculate the focus position P2 using an expression P2=P1−Df illustrated in FIG. 8, the main CPU 100 receives a result of the calculation of the focus position calculating section 121A and moves the second focus lens FLB to the calculated focus position and stops the second focus lens FLB in the calculated focus position.

When this configuration is adopted, since it is unnecessary to cause the second focus lens FLB to perform AF search, the AF search ends in the same time as in the past and, moreover, the individual difference between the first photographing section and the second photographing section is eliminated and the first and second focus lenses are respectively positioned at appropriate focus positions.

In this second embodiment, deviations are recorded in the flash ROM 102 for each of different focal lengths taking into account that, when the zoom switch 10D is operated and a focal length is changed, focus positions of the first and second focus lenses FLA and FLB change. The AF detecting section 120 receives a current focal length information from the main CPU 100 and reads out the deviation corresponding to the focal length information. When this configuration is adopted, even if the zoom switch 10D is operated and the focal length is changed, determination of an accurate focus position is performed.

In this way, the main CPU 100 may receive a result (P2=P1−Df) calculated by the focus position calculating section 121A and, as illustrated in FIG. 7(b), position the second focus lens FLB in the focus position P2 without performing AF search.

In the configuration of this second embodiment, as in the first embodiment, the individual difference between the first photographing section and the second photographing section is eliminated and accurate focus positions are respectively obtained for the first focus lens included in the first photographing section 1A and the second focus lens included in the second photographing section 1B.

In this second embodiment, the second focus lens is not moved and the second focus lens FLB is moved to and stopped at a position more deviated by the deviation Df from the first focus position. Therefore, AF search ends in substantially the same time as in the past.

Lastly, a procedure of focus position determination processing executed by the main CPU 100 in the second embodiment in cooperation with the DSP including in the AF detecting section 120 and the focus position calculating section 121A will be explained with reference to a flowchart of FIG. 9.

Figure 9:
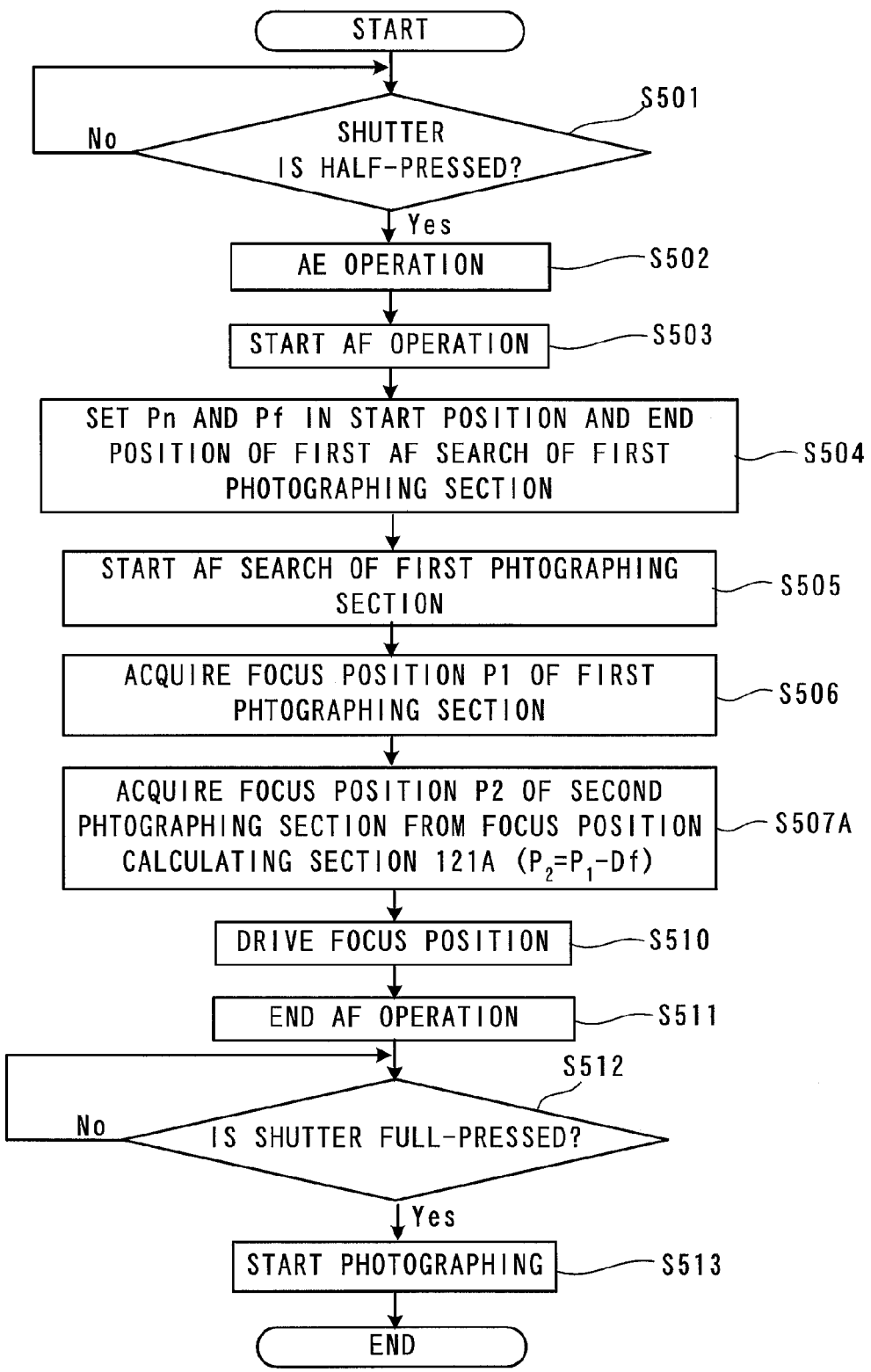
FIG. 9 is a flowchart illustrating a processing procedure of focus position determination executed by the main CPU 100 in cooperation with the DSP included in the AF detecting section and the lens driving section.
Figure 10A:
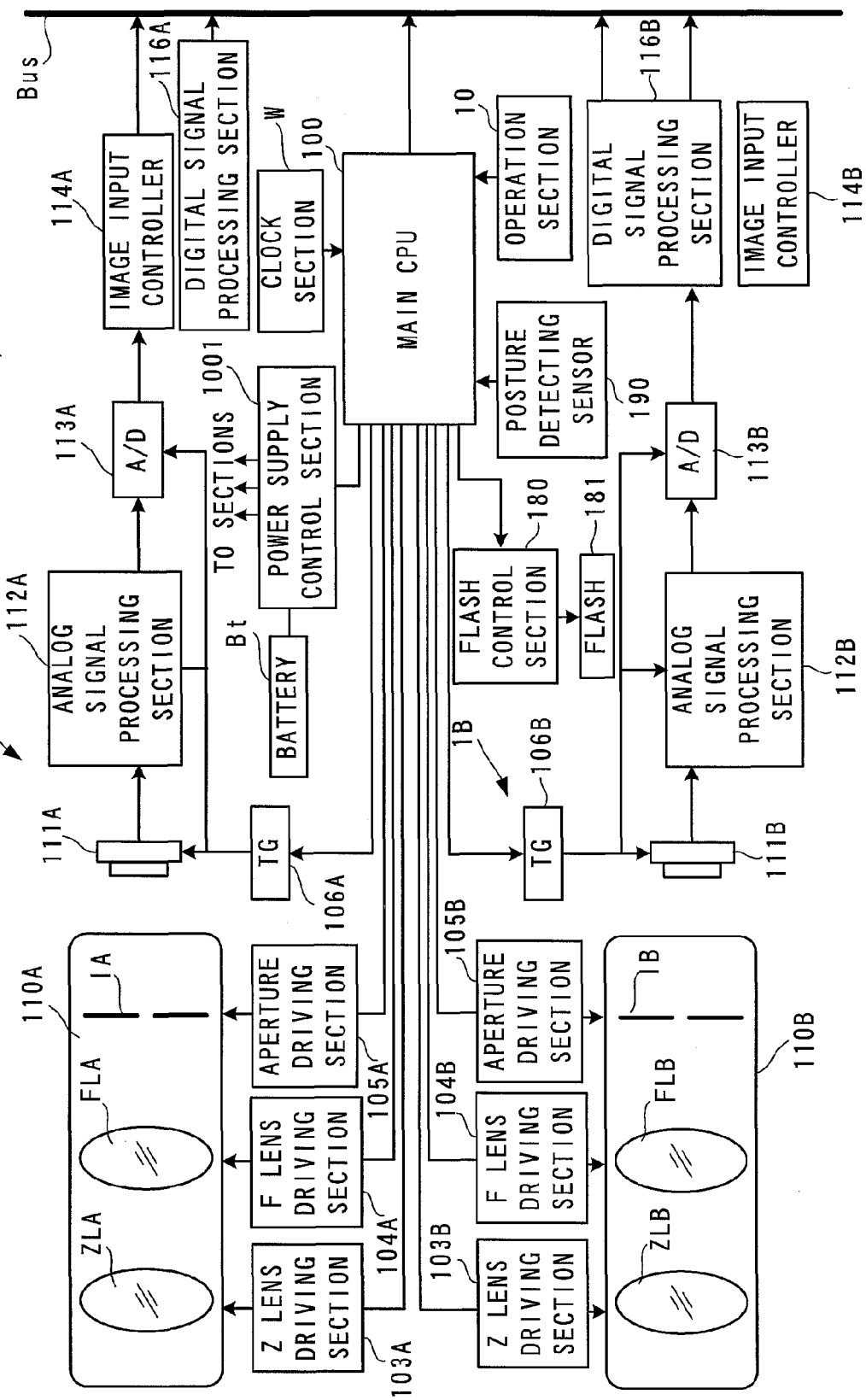
FIGS. 10A and 10B are a diagram for explaining a third embodiment.
Figure 10B:
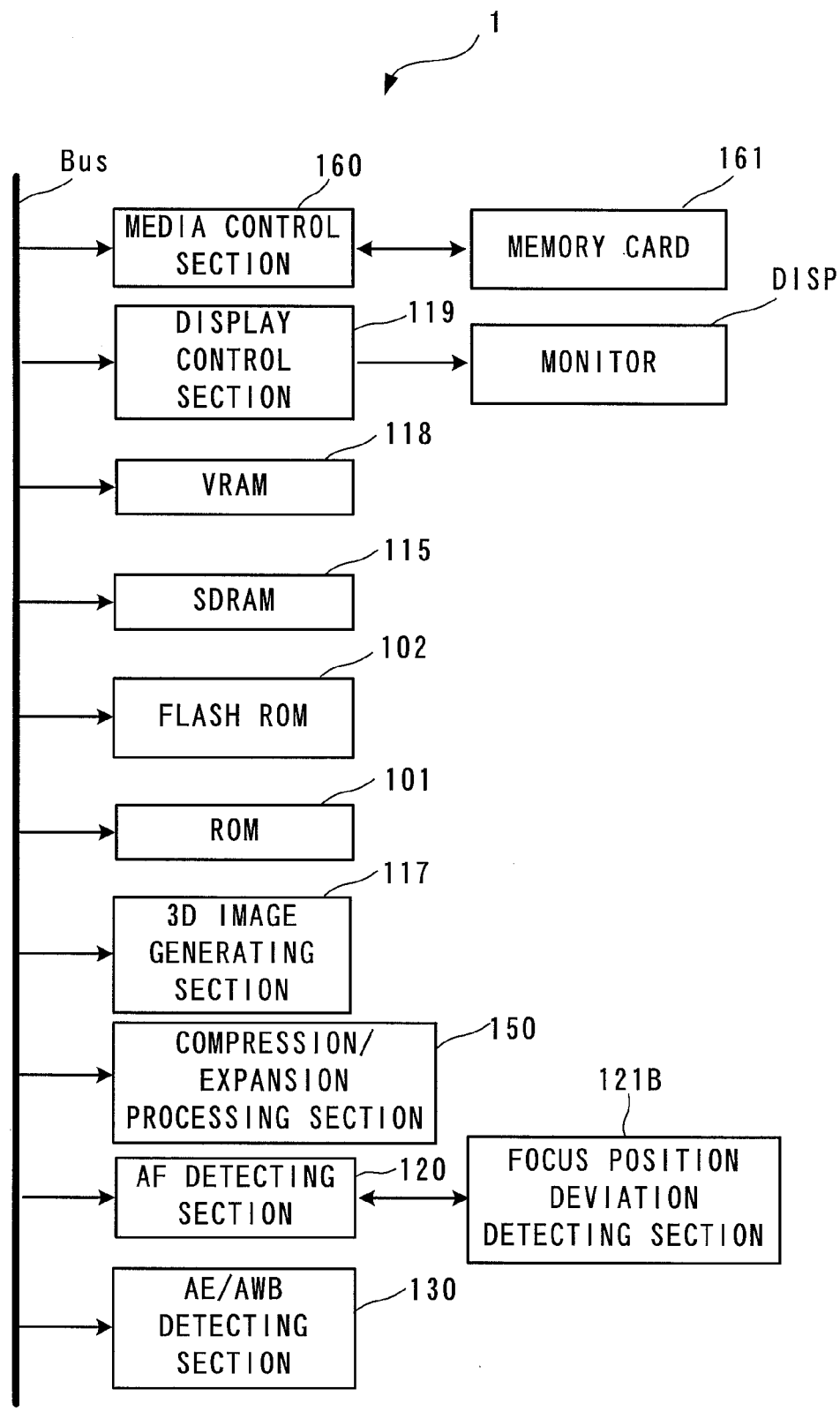

FIG. 9 is a flowchart illustrating a processing procedure of focus position determination executed by the main CPU 100 in the second embodiment in cooperation with the DSP including in the AF detecting section 120 and the like.

The processing is the same as the processing of the flow illustrated in FIG. 5 except that the processing in step S507 is changed to step S507A and the processing in step S508 and step S509 is omitted. Therefore, changed processing will be explained.

In step S507A, the AF detecting section 120 reads out the deviation Df from the flash ROM 102, supplies the deviation Df to the focus position calculating section 102A, and causes the focus position calculating section 102A to calculate the focus position P2 of the second focus lens FLB. In step S510, the main CPU 100 receives the focus position P2 which the CPU 100 causes the focus position calculating section 121A to calculate, and instructs the F lens driving section 104B to move the focus lens FLB to the focus position P2 and stop the focus lens FLB at the focus position P2.

In this embodiment, the processing in step S504 to step S506 is equivalent to an example of the processing in the first step according to the present invention. The processing in step S507A to step S510 is equivalent to an example of the processing in the second step according to the present invention.

When the main CPU 100 and the DSP included in the AF detecting section 120 execute the flow illustrated in FIG. 9, accurate focus position determination with an individual difference between the first photographing section 1A and the second photographing section 1B eliminated is carried out in substantially the same time as in the past.

FIGS. 10A to 13B are diagrams for explaining a third embodiment.

It is assumed that the photographing apparatus 1 having the external appearance illustrated in FIGS. 1(a) and 1(b) is also used in this third embodiment.

Like FIGS. 2A and 2B, FIGS. 10A and 10B are a diagram illustrating the internal configuration of the photographing apparatus illustrated in FIGS. 1(a) and 1(b) and is a diagram illustrating the same configuration as that in FIGS. 2A and 2B except that the search range setting section 121 is replaced with a deviation detecting section 121B. FIGS. 11(a), 11(b), 11(c) and 11(d) are diagrams for explaining a focus position determining method in which, during initial photographing, the main CPU 100 causes the AF detecting section 120 to perform detection of the first and second focus positions P1 and P2 while instructing the first F lens driving section 104A and the second F lens driving section 104B to move the first and second focus lenses FLA and FLB and stores the deviation Df of the focus positions in the DRAM 115 and, in second and subsequent photographing, causes the AF detecting section 120 to perform detection of the first focus position P1 while instructing the first F lens driving section 104A to move the first focus lens FLA, supplies the deviation Df and the first focus position P1 to the deviation detecting section, and causes the deviation detecting section to calculate a second focus position of the second focus lens FLB. FIG. 12 is a diagram for explaining processing contents of the deviation detecting section 121B.

In this third embodiment, a configuration is proposed in which, during initial photographing, the second focus lens is caused to move to and stop at the focus position P1 using the focus position determining method according to the first embodiment and the deviation Df indicating the individual difference between the first photographing section 1A and the second photographing section 1B is acquired and stored in the SDRAM 115 during the initial photographing and, during the following photographing, the AF detecting section 120 reads out the deviation Df from the SDRAM 115, supplies the deviation Df to the deviation detecting section 121B, and causes the deviation detecting section 121B to calculate the second focus position P2 using the focus position determining method according to the second embodiment, and the main CPU 100 receives the second focus position P2 from the deviation detecting section 121B and instructs the second driving section 104B to move the second focus lens FLB to a position more deviated by the deviation Df and stop the second focus lens FLB in the position.

In this third embodiment, an example of the focus position determining section according to the present invention includes the main CPU 100, the first and second F lens driving sections 104A and 104B, the first and second focus lenses FLA and FLB, the flash ROM 102, the AF detecting section 120, and the deviation detecting section 121B.

A focus position determining method that the main CPU 100 causes the AF detecting section 120 to perform while instructing the first F lens driving section 104A and the second F lens driving section 104B to move the first and second focus lenses will be explained with reference to FIGS. 11(a), 11(b), 11(c) and 11(d).

Figure 11A:
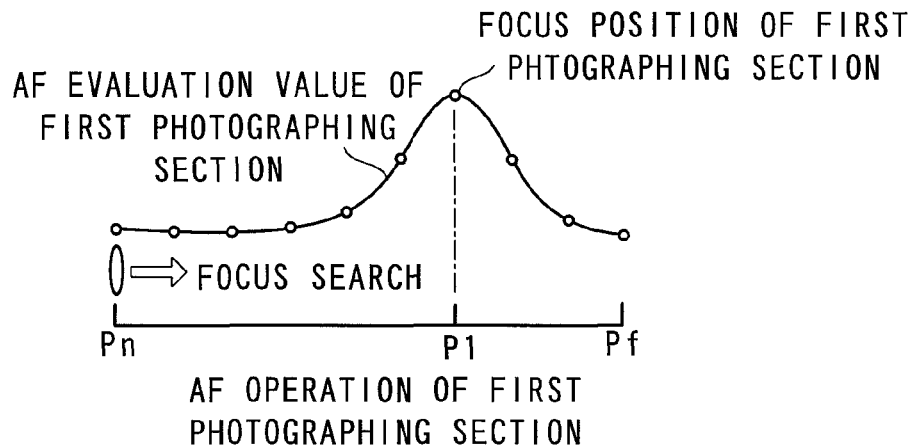
FIGS. 11(a), 11(b), 11(c) and 11(d) are diagrams for explaining a focus position determining method which the main CPU 100 causes the AF detecting section 120 to perform, while instructing the first F lens driving section 104A and the second F lens driving section 104B to move first and second focus lenses.
Figure 11B:
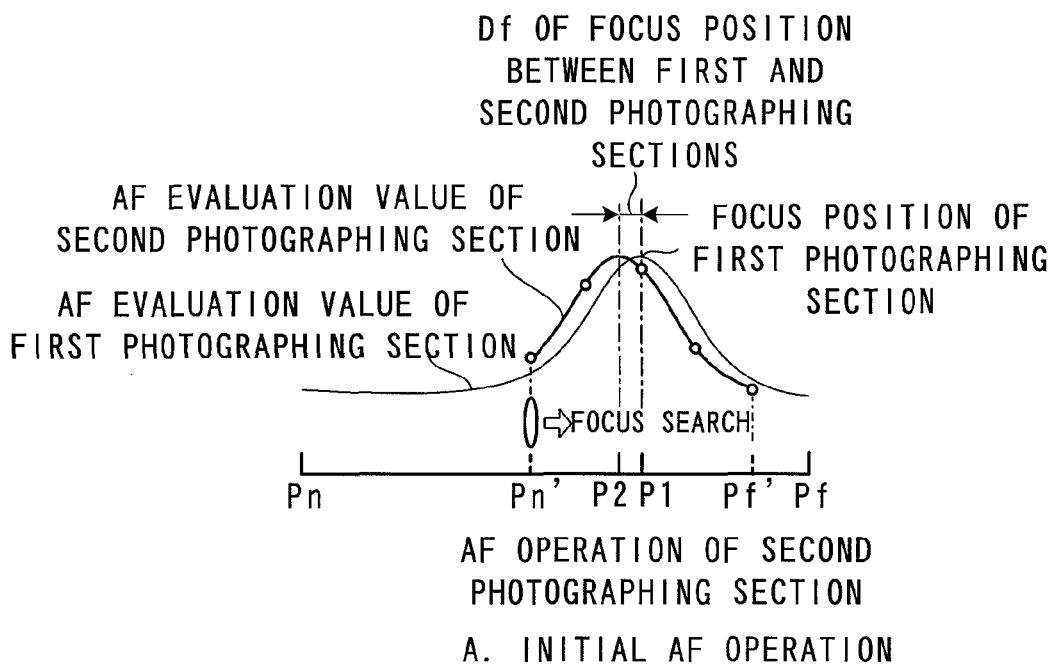
Figure 11:
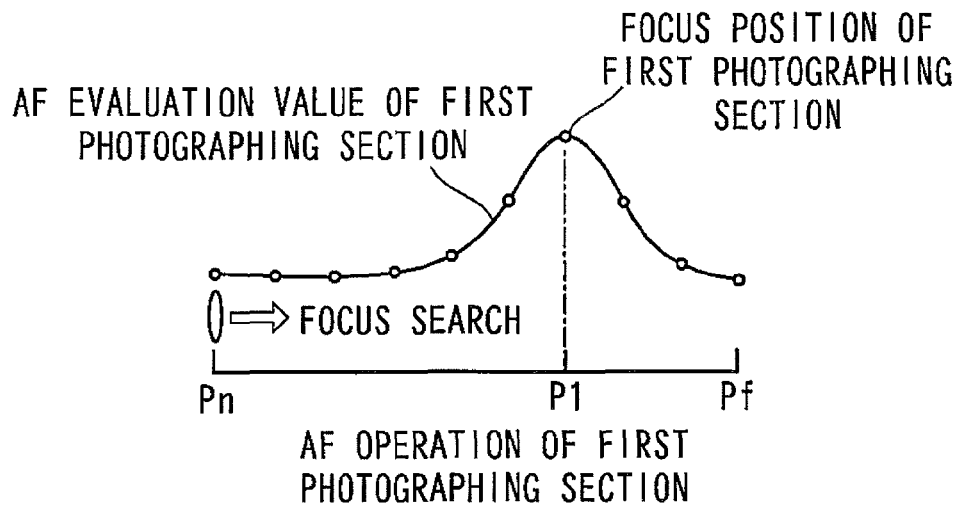
Figure 11:
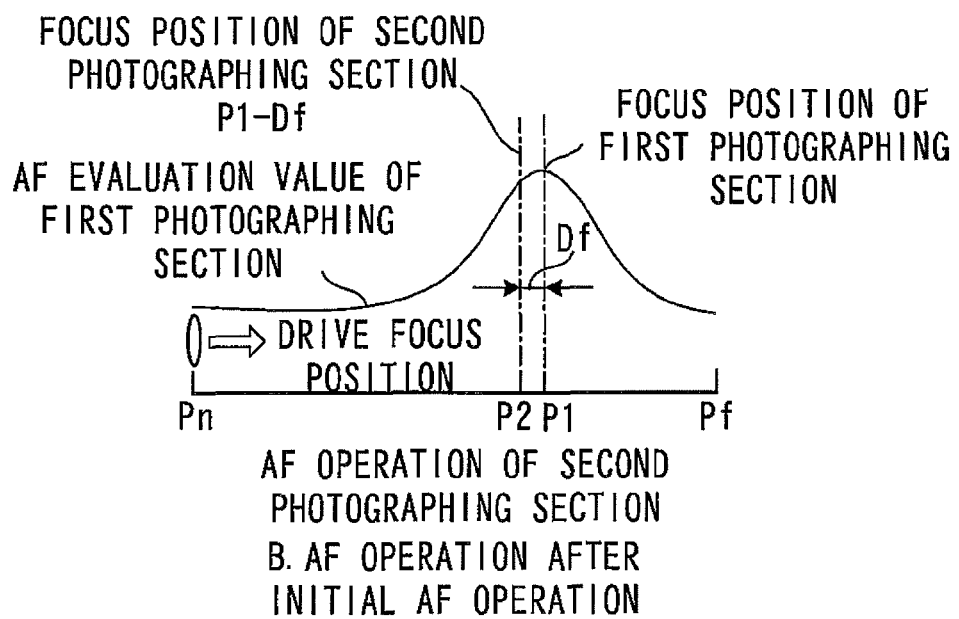
Figure 12:
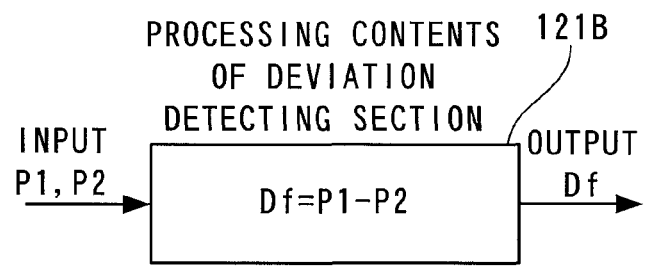
FIG. 12 is a diagram for explaining processing contents of the deviation detecting section 121B.

In FIGS. 11(a) and 11(b), it is indicated that, in initial photographing, as in the first embodiment, AF search is performed while the first focus lens FLA and the second focus lens FLB are caused to move. In FIGS. 11(c) and 11(d), it is illustrated that, in second and subsequent photographing, AF search is performed while the first focus lens FLA is moved and, for the second focus lens FLB, the second focus lens is positioned at a focus position using the deviation obtained by the initial photographing.

As illustrated in FIGS. 11(a), 11(b), 11(c) and 11(d), in the initial photographing, as in the first embodiment, the main CPU 100 causes the AF detecting section 120 to search for a focus position while instructing the first F lens driving section 104A to move the first focus lens FLA in the first search area (Pn to Pf). The main CPU 100 receives the focus position P1 where the AF evaluation value (contrast) detected by the AF detecting section 120 is the maximum, and instructs the first F lens driving section 104A to stop the focus lens FLA in the focus position P1.

Thereafter, the AF detecting section 120 inputs the focus position P1 to the deviation detecting section 121B, reads out the constants (the near side deviation N and the far side deviation F) as to the second search area from the flash ROM 102 and transfers the constants to the deviation detecting section 121B, and causes the deviation detecting section 121B to calculate the second search area. The main CPU 100 receives a result of the calculation via the bus Bus and causes the AF detecting section 120 to search for a focus position while instructing the second F lens driving section 104B to move the second focus lens FLB in the second search range (Pn' to Pf').

The main CPU 100 receives the focus position P2 where the AF evaluation value (contrast) of the second photographing section 1B detected by the AF detecting section 120 is the maximum and instructs the second F lens driving section 104A to stop the focus lens FLB in the focus position P2.

Consequently, as in the first embodiment, in the initial photographing, accurate focus position determination in which the individual difference between the two photographing sections eliminated is performed in time substantially the same as the AF time in the past.

In this embodiment, the deviation detecting section 121B calculates the deviation Df between the first focus position P1 and the second focus position P2 using an expression P1−P2 and stores the deviation Df in the SDRAM 115.

In the second and subsequent photographing, as illustrated in FIGS. 11c and 11(d), after the main CPU 100 causes the AF detecting section 120 to detect the focus position P1 while instructing the first F lens driving section 104A to move the first focus lens FLA in the first search area (Pn to Pf), the AF detecting section 120 reads out the deviation Df in the SDRAM 115 and supplies the deviation Df to the deviation detecting section 121B, and causes the deviation detecting section 121B to calculate the focus position P2 of the second focus lens FLB of the second photographing section 1B. The main CPU 100 receives the focus position P2 and instructs the second F lens driving section 104B to move the second focus lens FLB to the focus position P2 and stop the second focus lens FLB at the focus position P2.

When this configuration is adopted, in the second and subsequent photographing, as in the second embodiment, since it is unnecessary to cause AF search to be performed, accurate focus position determination in which the individual difference between the first photographing section and the second photographing section eliminated is performed in time same as the AF time in the past.

Lastly, a procedure of focus position determination processing executed by the main CPU 100 included in the focus position determining section in cooperation with the DSP including in the AF detecting section 120 and the deviation detecting section 121B will be explained with reference to a flow chart.

Figure 13A:
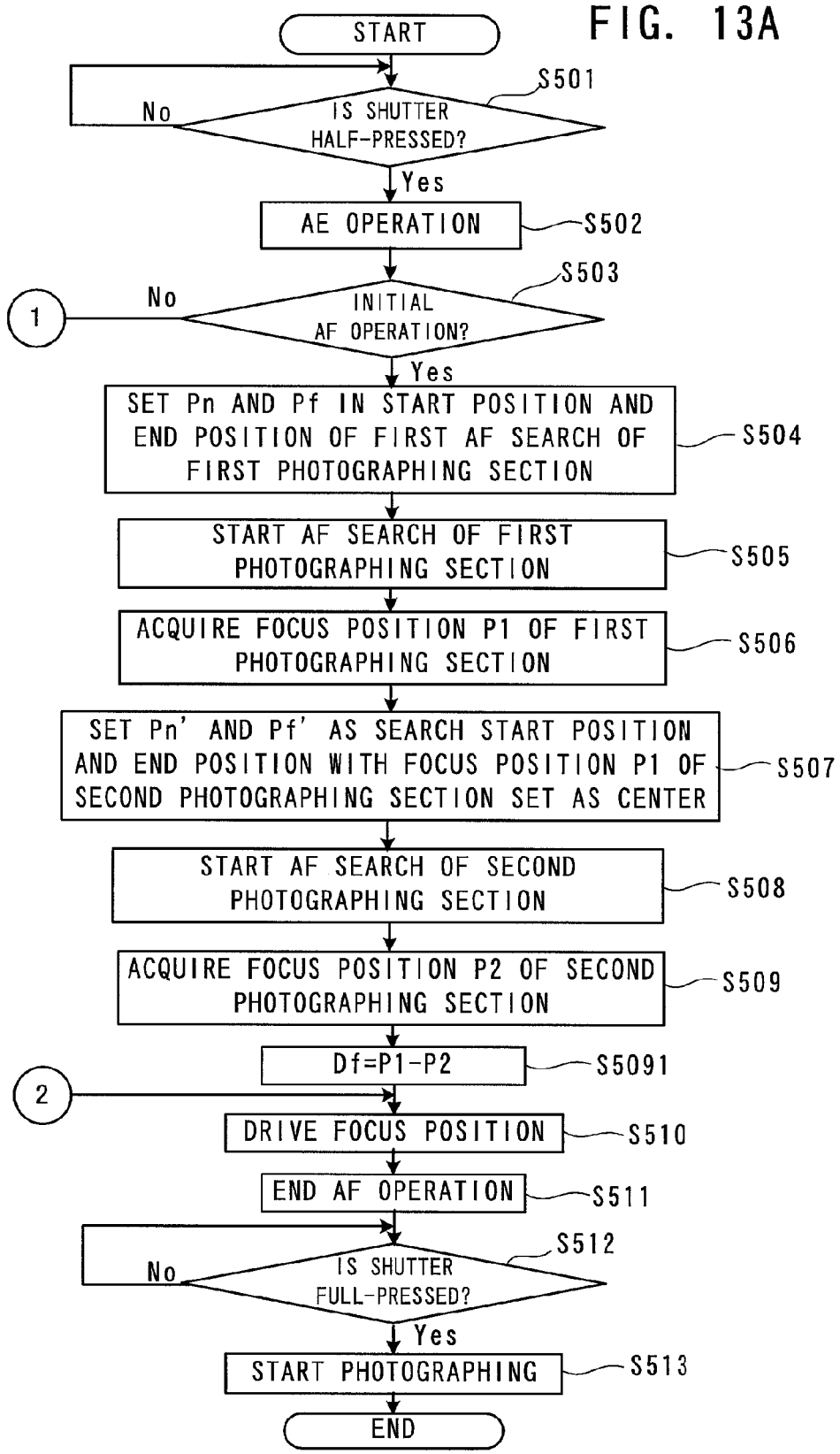
Figure 13B:
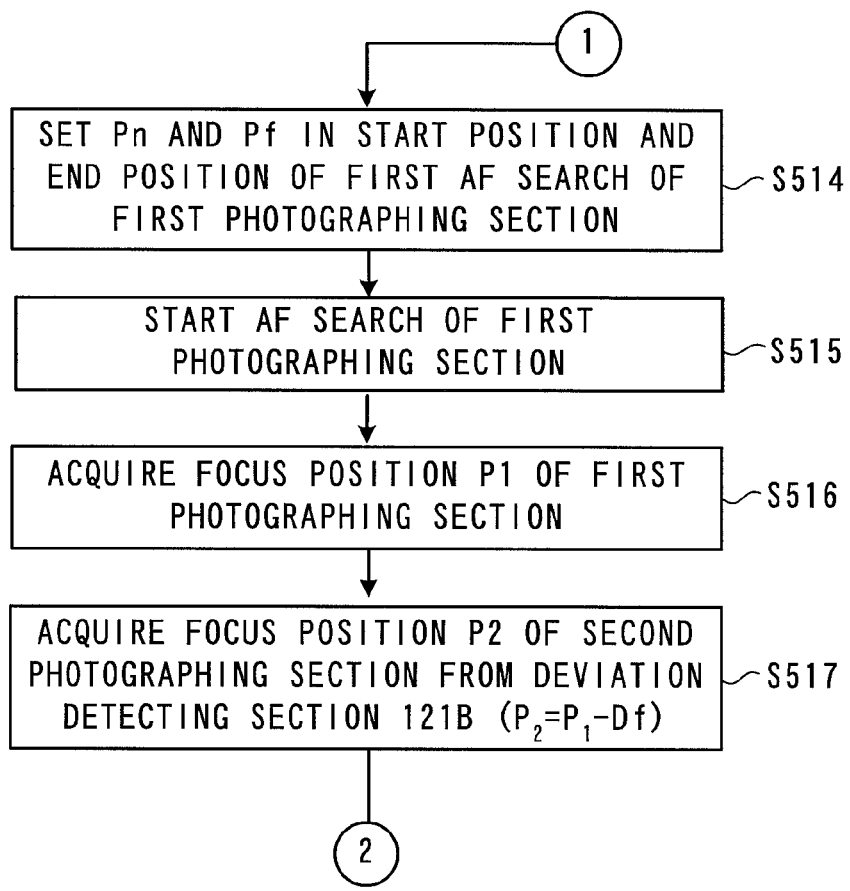

FIGS. 13A and 13B are a flowchart illustrating a processing procedure of focus position determination executed by the main CPU 100 in cooperation with the DSP.

In step S501, the main CPU 100 determines whether the shutter button 10C is half-pressed. When the main CPU 100 determines in step S501 that the shutter button 10C is not half-pressed, the main CPU 100 proceeds to a No side and repeats the processing in step S501. When the main CPU 100 determines in step S501 that the shutter button 10C is half-pressed, the main CPU 100 proceeds to a Yes side. When the main CPU 100 proceeds to the Yes side, in step S502, the AE/AWB detecting section 130 in the DSP receives a processing start instruction from the main CPU 100 and starts an AE operation. The main CPU 100 further proceeds to step S503 and determines whether photographing is initial photographing. When the main CPU 100 determines in step S503 that the photographing is the initial photographing, the main CPU 100 proceeds to a Yes side. According to a photographing start instruction from the main CPU 100, the AF detecting section starts an AF operation. Incidentally, whether photographing is the initial photographing in step S503 is, more specifically, determined according to whether an effective value of the deviation Df is stored in the SDRAM 115.

In step S504, first, the main CPU 100 sets the first search area (Pn to Pn in FIG. 4) in the first F lens driving section 104A. In the next step S505, the main CPU 100 causes the AF detecting section 120 to perform detection of a focus position while moving the first focus lens FLA of the first photographing optical system.

In step S506, the AF detecting section 120 acquires the focus position P1 of the first focus lens FLA in the photographing optical system included in the first photographing section 1A. In response to the acquisition of the focus position P1, the main CPU 100 instructs the first F lens driving section 104A to stop the first focus lens FLA at the first focus position P1.

In step S507, the AF detecting section 120 supplies the focus position P1 to the deviation detecting section 121B, reads out the near side deviation N and the far side deviation F from the flash ROM 102 and supplies the near side deviation N and the far side deviation F to the deviation detecting section 121, and causes the deviation detecting section 121B to calculate the second search area using the equation illustrated in FIG. 12. In step S507, the main CPU 100 acquires the second search area from the deviation detecting section 121B. In step S508, the main CPU 100 sets the search start position Pn' and the search end position Pf' of the second search area in the second F lens driving section 104B. In step S509, the main CPU 100 causes the AF detecting section 120 to detect the focus position P2 while causing the focus lens FLB to move in the second search range. In step S510, the main CPU 100 receives the focus position P2 from the AF detecting section 120 and instructs the second F lens driving section 104B to move the second focus lens FLB to the focus position P2 and stop the second focus lens FLB in the focus position P2. In the next step S5091, the AF detecting section 120 causes the deviation detecting section 121B to calculate a deviation between the focus position P1 and the focus position P2 and stores the deviation in the SDRAM 115.

After ending the AF operation in step S511, in step S512, the main CPU 100 waits for full-press of the shutter button 10C. When the main CPU 100 determines in step S512 that the shutter button 10C is not full-pressed, the main CPU 100 proceeds to a No side and repeats the processing in step S512. When the main CPU 100 determines that the shutter button 10C is full-pressed, the main CPU 100 proceeds to a Yes side and executes photographing processing.

The initial photographing processing ends.

In the next and subsequent photographing, in step S503, the main CPU 100 proceeds to a No side. In step S514, first, the main CPU 100 sets the first search area (Pn to Pf in FIG. 11(c)) in the first F lens driving section 104A. In the next step S515, the main CPU 100 causes the AF detecting section 120 to perform detection of a focus position while moving the first focus lens FLA of the first photographing optical system. Then, the main CPU 100 instructs, on the basis of the focus position P1 that the main CPU 100 causes the AF detecting section 120 to detect, the first F lens driving section 104A to move the first focus lens FLA to the focus position P1 and stop the first focus lens FLA at the focus position P1.

In step S516, the AF detecting section 120 acquires the focus position P1 of the first focus lens FLA in the photographing optical system included in the first photographing section 1A, supplies the focus position P1 to the deviation detecting section 121B, reads out the deviation Df in the SDRAM 115, and supplies the deviation Df to the deviation detecting section 121B. In step S517, the main CPU 100 causes the deviation detecting section 121B to detect the second focus position P2 using the equation $P2=P1-Df$ illustrated in FIG. 12. The main CPU 100 receives the second focus position P2 from the deviation detecting section 121B and instructs the second lens driving section 104B to move the second focus lens to the second focus position P2 and stop the second focus lens in the second focus position P2.

In this embodiment, the processing from step S504 to step S509 of the flow related to the initial photographing in FIG. 13A is equivalent to an example of the processing in the first step according to the present invention. The processing in step S5091 of the flow related to the initial photographing in FIG. 13A is equivalent to an example of the processing in the second step according to the present invention. The processing from step S514 to step S517 of the flow related to the second and subsequent photographing in FIG. 13B is equivalent to an example of processing in the third step according to the present invention.

When this configuration is adopted, in the initial photographing, as in the first embodiment, the AF search ends in substantially the same time as in the past, the individual difference between the first photographing section and the second photographing section is eliminated, and accurate focus position determination is performed. In the second and subsequent photographing, as in the second embodiment, the AF search ends in the same time as in the past, and the individual difference between the first photographing section and the second photographing section is eliminated, and accurate focus position determination is performed.

Incidentally, in the third embodiment, the deviation Df is stored in the SDRAM 115. However, the deviation Df may be stored in the flash ROM 102. When the deviation Df is stored in the flash ROM 102, it is unnecessary to store the deviation in initial photographing after the power supply is turned off and then turned on. If a nonvolatile flash ROM rewritable even after being mounted is used, unlike the second embodiment, it is unnecessary to store the deviation in the flash ROM during manufacturing. This configuration may be extended such that a photographer freely stores a deviation in the deviation storing section every week, every month, or the like through operation.

In the above-described embodiments, the photographing apparatus that performs stereoscopic photographing is explained. However, the present invention may be a photographing apparatus that performs panoramic photographing in two photographing sections, may be a photographing apparatus that performs photographing at different sensitivities in respective two photographing sections, may be a photographing apparatus that performs photographing with different tints in respective photographing sections, or may be a photographing apparatus that performs photographing with different levels of luminance in respective two photographing sections. The focus position determining method of the present invention is applicable in each of the photographing apparatuses.

Reference Signs List
1 photographing apparatus
1A first photographing section
1B second photographing section
100 main CPU
101 ROM
102 flash ROM
104A first F lens driving section
104B second F lens driving section
110A first photographing optical system
110B second photographing optical system
111A first imaging element
111B second imaging element
112A first analog signal processing section
112B second analog signal processing section
116A first digital signal processing section
116B second digital signal processing section
120 AF detecting section
121 search range setting section
121A focus position calculating section
121B deviation detecting section
130 AE/AWB detecting section

What is claimed is:

1. A photographing apparatus comprising:
a first photographing section that includes a first photographing optical system which includes a first focus lens, a first focus lens driving section which moves the first focus lens in an optical axis direction, and a first imaging element which receives subject light obtained by focusing a subject with the first photographing optical system and generates an image signal representing the subject;
a second photographing section that includes a second photographing optical system which includes a second focus lens, a second focus lens driving section which moves the second focus lens in an optical axis direction, and a second imaging element which receives subject light obtained by focusing the subject with the second photographing optical system and generates an image signal representing the subject;
a focus position determining section that instructs the first and second focus lens driving sections to search for focus positions while moving the first and second focus lenses and to stop the first and second focus lenses at the focus positions, respectively; and
a deviation storing section that stores a deviation of the focus position of the second focus lens searched by the focus position determining section from the focus position of the first focus lens searched by the focus position determining section; wherein
the focus position determining section performs:
when the deviation is not stored in the deviation storing section, a first focus position determination, to search for the focus position while moving the first focus lens in a predetermined first search area and to stop the first focus lens at the focus position, and for the second photographing optical system, to search for the focus position while moving the second focus lens in a second search area narrower than the first search area including a focus expected position of the second focus lens corresponding to the focus position of the first focus lens and to stop the second focus lens at the focus position, and when the deviation is stored in the deviation storing section, a second focus position determination, for the first photographing optical system, to search for the focus position while moving the first focus lens and to stop the first focus lens at the focus position, and for the second photographing optical system, to move the second focus lens to a position more deviated by the deviation stored in the deviation storing section than a focus position corresponding to the focus position of the first focus lens.

2. The photographing apparatus according to claim 1, wherein the focus position determining section performs the first focus position determination when the focus position is determined in the photographing apparatus of interest for the first time, causes the deviation storing section to store the deviation of the focus position of the second focus lens from the focus position of the first focus lens, and performs the second focus determination when the focus position is determined in the photographing apparatus of interest for a second and subsequent time.

3. The photographing apparatus according to claim 1, wherein both of the first photographing optical system and the second photographing optical system are variable in focal length and are adjusted to a same focal length, and
the deviation storing section stores the deviation for each of a plurality of the focal lengths.

4. The photographing apparatus according to claim 1, wherein the first photographing optical system and the second photographing optical system are positioned side by side and generate image signals for a stereoscopic view.

5. A focus position determining method in a photographing apparatus including two photographing sections of: a first photographing section that includes a first photographing optical system which includes a first focus lens, a first focus lens driving section which moves the first focus lens in an optical axis direction, and a first imaging element which receives subject light obtained by focusing a subject with the first photographing optical system and generates an image signal representing the subject; and a second photographing section that includes a second photographing optical system which includes a second focus lens, a second focus lens driving section which moves the second focus lens in an optical axis direction, and a second imaging element which receives subject light obtained by focusing the subject with the second photographing optical system and generates an image signal representing the subject, and the photographing apparatus further including a deviation storing section that stores a deviation of a focus position of the second focus lens from a focus position of the first focus lens, the focus position determining method comprising:

a first step including searching for, when the deviation is not stored in the deviation storing section, a focus position while moving the first focus lens in a predetermined first search area and stopping the first focus lens at the focus position;

a second step including searching for a focus position while moving the second focus lens in a second search area narrower than the first search area including a focus expected position of the second focus lens corresponding to the focus position of the first focus lens, and stopping the second focus lens at the focus position; and a third step being performed instead of performing the first step and the second step when the deviation is stored in the deviation storing section, the third step including, for the first photographing optical system, searching for a focus position while moving the first focus lens and stopping the first focus lens at the focus position and, for the second photographing optical system, moving the second focus lens to a position more deviated by the deviation stored in the deviation storing section than a focus position corresponding to the focus position of the first focus lens.

* * * * *